(12) United States Patent
Nagata et al.

(10) Patent No.: US 10,375,584 B2
(45) Date of Patent: Aug. 6, 2019

(54) RADIO BASE STATION, USER TERMINAL, RADIO COMMUNICATION SYSTEM AND INTERFERENCE ESTIMATION METHOD

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/404,647

(22) PCT Filed: May 28, 2013

(86) PCT No.: PCT/JP2013/064758
§ 371 (c)(1),
(2) Date: Dec. 1, 2014

(87) PCT Pub. No.: WO2013/183491
PCT Pub. Date: Dec. 12, 2013

(65) Prior Publication Data
US 2015/0195715 A1 Jul. 9, 2015

(30) Foreign Application Priority Data
Jun. 4, 2012 (JP) .................................. 2012-127183

(51) Int. Cl.
*H04W 24/02* (2009.01)
*H04W 88/08* (2009.01)
(Continued)

(52) U.S. Cl.
CPC ......... *H04W 24/02* (2013.01); *H04J 11/0056* (2013.01); *H04L 5/14* (2013.01);
(Continued)

(58) Field of Classification Search
CPC ..... H04W 24/02; H04W 88/08; H04W 24/08; H04L 5/14; H04L 5/1469
See application file for complete search history.

(56) References Cited

U.S. PATENT DOCUMENTS

| 2006/0035660 A1* | 2/2006 | Anderson ............. H04W 52/06 455/522 |
| 2006/0094372 A1* | 5/2006 | Ahn ...................... H04L 1/0003 455/67.13 |

(Continued)

FOREIGN PATENT DOCUMENTS

| JP | 2011-120095 A | 6/2011 |
| JP | 2012-054711 A1 | 3/2012 |

(Continued)

OTHER PUBLICATIONS

U.S. Appl. No. 61/624,185.*
(Continued)

*Primary Examiner* — Gbemileke J Onamuti
(74) *Attorney, Agent, or Firm* — Osha Liang LLP

(57) ABSTRACT

A radio base station is disclosed that receives an uplink signal using a time division duplexing (TDD) scheme, including an estimation section that estimates an interference level that the uplink signal receives in a plurality of subframes of which a downlink/uplink configuration differs among cells and a transmission section that transmits information about the interference level. The information about the interference level comprises interference levels about the plurality of subframes.

15 Claims, 15 Drawing Sheets

(51) Int. Cl.
*H04L 5/14* (2006.01)
*H04W 24/08* (2009.01)
*H04J 11/00* (2006.01)

(52) U.S. Cl.
CPC ........... *H04L 5/1469* (2013.01); *H04W 24/08* (2013.01); *H04W 88/08* (2013.01)

(56) References Cited

U.S. PATENT DOCUMENTS

| | | | |
|---|---|---|---|
| 2008/0064432 A1 | 3/2008 | Park et al. | |
| 2011/0039595 A1* | 2/2011 | Luo | H04W 52/243 455/522 |
| 2012/0170508 A1* | 7/2012 | Sawai | H04B 7/155 370/315 |
| 2013/0033998 A1 | 2/2013 | Seo et al. | |
| 2013/0090127 A1 | 4/2013 | Nishikawa et al. | |
| 2013/0170406 A1 | 7/2013 | Kishiyama | |
| 2013/0272170 A1* | 10/2013 | Chatterjee | H04W 28/02 370/280 |
| 2013/0294333 A1* | 11/2013 | Chen | H04L 5/0048 370/328 |
| 2014/0161003 A1* | 6/2014 | Han | H04W 52/146 370/280 |

FOREIGN PATENT DOCUMENTS

| | | | |
|---|---|---|---|
| WO | 2009/019892 A1 | 2/2009 | |
| WO | 2011/122833 A2 | 10/2011 | |

OTHER PUBLICATIONS

Office Action issued in corresponding Japanese Application No. 2012-127183, dated Apr. 7, 2015 (5 pages).
Alcatel-Lucent; "Evaluation for multiple outdoor Pico-cells scenario with Macro layer and discussion of interference mitigation"; 3GPP TSG RAN WG1 Meeting #69, R1-122507; Prague, Czech Republic; May 21-25, 2012 (8 pages).
MediaTek, Inc.; "Discussion on HARQ feeback mechanism and cross-carrier scheduling in inter-band CA with different TDD UL-DL configurations"; 3GPP TSG-RAN WG1 Meeting #67, R1-113864; San Francisco, USA; Nov. 14-18, 2011 (6 pages).
International Search Report for corresponding International Application No. PCT/JP2013/064758, dated Aug. 13, 2013 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
Extended Search Report issued in corresponding European Application No. 13801430.3, dated Jan. 7, 2016 (8 pages).
Office Action dated Jul. 18, 2016 in corresponding Chinese Patent Application No. 201380027094.5 (6 pages).
Office Action issued in corresponding Chinese Application No. 201380027094.5, dated Nov. 11, 2016 (16 pages).
Office Action issued in counterpart Chinese Patent Application No. 201710070897.9, dated Apr. 24, 2018 (18 pages).

* cited by examiner

RADIO BASE STATION, USER TERMINAL, RADIO COMMUNICATION SYSTEM AND INTERFERENCE ESTIMATION METHOD

TECHNICAL FIELD

The present invention relates to a radio base station, a user terminal, a radio communication system and an interference estimation method in a radio communication system using a time division duplexing (TDD) scheme.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in an LTE system, it is possible to achieve a transmission rate of about maximum 300 Mbps on the downlink and about 75 Mbps on the uplink by using a variable band, which ranges from 1.4 MHz to 20 MHz. Also, in the UMTS network, successor systems of the LTE system (referred to as, for example, "LTE-Advanced" or "LTE enhancement" (hereinafter referred to as "LTE-A")) are under study for the purpose of achieving further broadbandization and increased speed.

Now, in radio communication, as uplink and downlink duplexing schemes, there are frequency division duplexing (FDD), which divides between the uplink and the downlink based on frequency, and time division duplexing (TDD), which divides between the uplink and the downlink based on time. In TDD, the same frequency is applied to uplink and downlink transmission, and, from one transmitting point, transmission is conducted separately between the uplink and the downlink based on time. Since the same frequency is used between the uplink and the downlink, each transmitting/receiving point (radio base station or user terminal) has to switch between transmission and reception.

Also, in TDD in the LTE system, DL/UL configurations to show combinations of downlink (DL) and uplink (UL) transmission ratios in a radio frame (formed with ten subframes) are defined (see FIG. 1). For example, FIG. 1 shows a plurality of DL/UL configurations 0 to 6, between which the ratios of DL subframes and UL subframes vary. In the LTE system, interference between uplink signals and downlink signals of neighboring transmitting/receiving points is prevented by applying the same DL/UL configuration between neighboring transmitting/receiving points.

CITATION LIST

Non-Patent Literature

Non-Patent Literature 1: 3GPP, TR 25.912 (V7.1.0), "Feasibility Study for Evolved UTRA and UTRAN," September 2006

SUMMARY OF INVENTION

Technical Problem

Now, in TDD in the LTE-A system, a study is in progress to change the downlink (DL) and uplink (UL) transmission ratios in radio frames dynamically or semi-statically on a per transmitting/receiving point basis—that is, change the DL/UL configuration dynamically or semi-statically on a per transmitting/receiving point.

When different DL/UL configurations are applied between neighboring transmitting/receiving points, it is expected that uplink signals and downlink signals are transmitted using the same time and frequency regions between neighboring cells. In this case, there is a threat that the quality of communication deteriorates due to interference between uplink signals and downlink signals of neighboring transmitting/receiving points. To take preventive measures against this deterioration of communication quality, it is necessary to adequately estimate the interference level between uplink signals and downlink signals of neighboring transmitting/receiving points.

The present invention has been made in view of the above, and it is therefore an object of the present invention to provide a radio base station, a user terminal, a radio communication system and an interference estimation method whereby, when different DL/UL configurations are applied between neighboring transmitting/receiving points, the interference level between uplink signals and downlink signals of the neighboring transmitting/receiving points can be estimated adequately.

Solution to Problem

The radio base station of the present invention is a radio base station that receives an uplink signal from a user terminal using a time division duplexing (TDD) scheme, and this radio base station includes a receiving section configured to receive interference estimation resource information, which is used to estimate an interference level that the uplink signal from the user terminal to the radio base station receives from at least one of a downlink signal that is transmitted from another radio base station that neighbors the radio base station by using the TDD scheme, and an uplink signal from another user terminal that neighbors the radio base station, and an estimation section configured to estimate the interference level based on the interference estimation resource information.

The user terminal of the present invention is a user terminal that receives a downlink signal from a radio base station using a time division duplexing (TDD) scheme, and this user terminal includes a receiving section configured to receive interference estimation resource information, which is used to estimate an interference level that the downlink signal transmitted from the radio base station to the user terminal receives from at least one of an uplink signal from another user terminal that neighbors the radio base station by using the TDD scheme, and that is connected to another radio base station, and a downlink signal from another radio base station that neighbors the user terminal, and an estimation section configured to estimate the interference level based on the interference estimation resource information.

The radio communication system of the present invention is a radio communication system in which an uplink signal from a first user terminal to a first radio base station and a downlink signal from a second radio base station that neighbors the first radio base station to a second user terminal are transmitted using a time division duplexing (TDD) scheme, wherein: an interference level that the uplink signal from the first user terminal to the first radio base station receives from at least one of the downlink signal from the second radio base station and an uplink signal from a user terminal that neighbors the first radio base station, or the interference level that the downlink signal from the second radio base station to the second user terminal receives from at least one of the uplink signal from the first user terminal and a downlink signal from a radio base station that neighbors the second user terminal is estimated.

The interference estimation method of the present invention is an interference estimation method in a radio communication system in which an uplink signal from a first user terminal to a first radio base station and a downlink signal from a second radio base station that neighbors the first radio base station to a second user terminal are transmitted using a time division duplexing (TDD) scheme, the interference estimation method comprising the steps of: estimating an interference level that the uplink signal from the first user terminal to the first radio base station receives from at least one of the downlink signal from the second radio base station and an uplink signal from a user terminal that neighbors the first radio base station, or the interference level that the downlink signal from the second radio base station to the second user terminal receives from at least one of the uplink signal from the first user terminal and a downlink signal from a radio base station that neighbors the second user terminal.

Advantageous Effects of Invention

According to the present invention, when different DL/UL configurations are applied between neighboring transmitting/receiving points, it is possible to adequately estimate the interference level between uplink signals and downlink signals between neighboring transmitting/receiving points.

DESCRIPTION OF EMBODIMENTS

Now, an example of a radio communication system according to the present embodiment will be described with reference to FIG. 2A. The radio communication system shown in FIG. 2A is configured by including radio base stations #1 and #2 that form cells #1 and #2, respectively, and user terminals (UEs) #1 and #2 that communicate with radio base stations #1 and #2, respectively.

Figure 1:
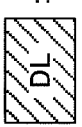
FIG. 1 is a diagram to show examples of DL/UL configurations in TDD.
Figure 2A:
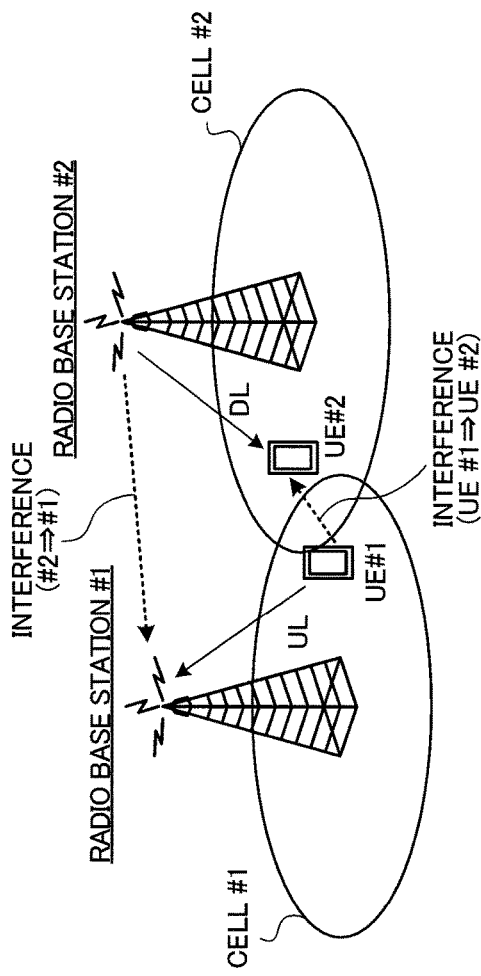
FIG. 2 provides diagrams to show an example of a radio communication system where varying DL/UL configurations are applied between neighboring transmitting/receiving points.

In the radio communication system shown in FIG. 2A, radio communication between radio base station #1 and user terminal #1 (and between radio base station #2 and user terminal #2) is carried out using the time division duplexing (TDD) scheme. That is, in radio base stations #1 and #2, the same frequency region is applied to DL and UL transmission, and transmission from radio base stations #1 and #2 is conducted by dividing between DL and UL in the time domain. In this case, if different DL/UL configurations (see FIG. 1) are applied between neighboring radio base stations #1 and #2, cases might occur where interference is produced between radio base stations #1 and #2 and between user terminals #1 and #2.

Figure 2B:
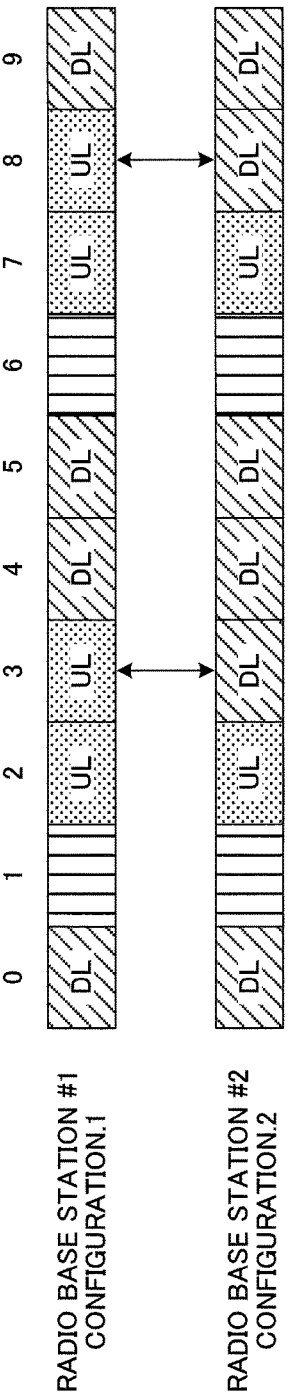

For example, when, as shown in FIG. 2B, radio base station #1 adopts DL/UL configuration 1 and radio base station #2 adopts DL/UL configuration 2, subframes #3 and #8 are for the uplink (UL) in radio base station #1, and for the downlink (DL) in radio base station #2. At this time, uplink signals from cell #1 and downlink signals from cell #2 may be transmitted using the same time and frequency regions, resulting in interference between uplink signals and downlink signals of neighboring transmitting/receiving points (between radio base stations #1 and #2 or between user terminals #1 and #2).

Figure 3:
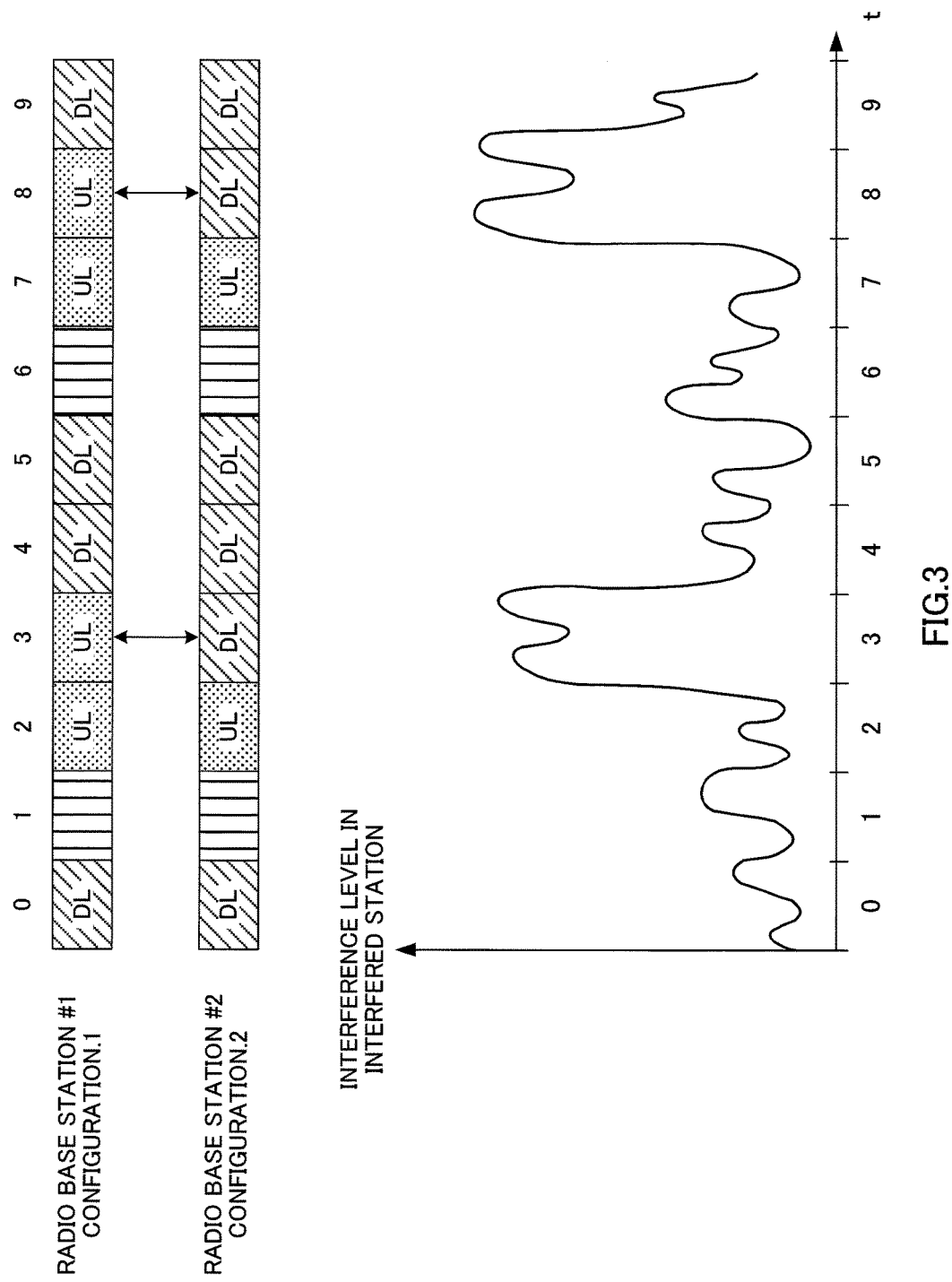
FIG. 3 is a diagram to explain interference when different DL/UL configurations are applied between neighboring transmitting/receiving points.

To be more specific, in subframes #3 and #8 of FIG. 2B, uplink signals from user terminal #1 to radio base station #1 are interfered with by downlink signals from radio base station #2 to user terminal #2. Consequently, as shown in FIG. 3, the interference level in radio base station #1 ("interfered station") becomes high compared to the interference level in other subframes.

Similarly, in subframes #3 and #8 in FIG. 2B, downlink signals from radio base station #2 to user terminal #2 are interfered with by uplink signals from user terminal #1 to radio base station #1. Consequently, as shown in FIG. 3, the interference level in user terminal #2 (interfered station) also becomes high compared to the interference level in other subframes.

In this way, when different DL/UL configurations are applied between neighboring transmitting/receiving points, in subframes where uplink signals and downlink signals are transmitted (subframes #3 and #8 in FIG. 3), the interference level in the interfered station (radio base station #1 or user terminal #2 in FIG. 2A) becomes relatively high. On the other hand, in subframes where the same uplink signal or downlink signal is transmitted between neighboring transmitting/receiving points (subframes #0 and #2 and so on in FIG. 3), the interference level in the interfered station becomes relatively low.

In this case, even if the interference level in subframes #0 and #2 and others is estimated, it is still not possible to reduce the impact of interference which the interfered station (radio base station #1 or user terminal #2 in FIG. 2A) receives from the interfering station (radio base station #2 or user terminal #1 in FIG. 2A). To reduce the impact of interference which the interfered station receives, it is necessary to estimate the interference amount in subframes #3 and #8, where the interfered station is influenced by the interfering station. Consequently, in order to reduce the impact of influence in the interfered station, there is a demand to make it possible to adequately estimate the interference level which the interfered station receives from the interfering station.

So, the present inventors have conceived of making it possible to adequately estimate the level of interference which the interfered station receives from the interfering station, by reporting interference estimation resource information to use to estimate the interference level to the interfered station, when different DL/UL configurations are applied between neighboring transmitting/receiving points, and arrived at the present invention.

Now, the interference estimation method according to the present embodiment will be described. The interference estimation method according to the present embodiment is used in a radio communication system where uplink signals from user terminal #1 (the first user terminal) to radio base station #1 (the first radio base station) and downlink signals from radio base station #2 (the second radio base station), which neighbors radio base station #1, to user terminal #2 (the second user terminal) are transmitted using the time division duplexing (TDD) scheme. To be more specific, the interference estimation method according to the present embodiment is used when, in the above radio communication system, the above uplink signals and downlink signals are transmitted in time regions and frequency regions that overlap at least in part.

With the interference estimation method according to the present embodiment, interference estimation resource information that is used to estimate the interference level against uplink signals from user terminal #1 to radio base station #1 or the interference level against downlink signal from radio base station #2 to user terminal #2 is received. Also, based on the interference estimation resource information received, the above interference levels are estimated.

Here, the interference which uplink signals from user terminal #1 to radio base station #1 receives may include interference by downlink signals from radio base station #2 to user terminal #2, and, in addition, include interference by uplink signals from other user terminals that neighbor radio base station #1 (if located near radio base station #1, these user terminals may be connected to radio base station #1, or may be connected to other radio base stations as well). Also, the interference which downlink signals from radio base station #2 to user terminal #2 receives may include interference by uplink signals from user terminal #1 to radio base station #1, and, in addition, include interference by downlink signals from other radio base station that neighbor user terminal #2.

Also, interference estimation resource information may indicate the radio resources where the above interference levels should be estimated (hereinafter referred to as "interference estimation resources"), and the radio resources that serve as reference points upon estimating interference levels (hereinafter referred to as "interference estimation reference resources") and so on. The interference estimation resources and the interference estimation reference resource are both at least one of a predetermined time region and frequency region, and are specified using, for example, time domain units such as subframes and radio frames, and frequency domain units such as resource blocks and bandwidth.

Although cases will be described below as examples where the DL/UL configurations shown in FIG. 1 are applied to each transmitting/receiving point (radio base stations #1 and #2 and user terminals #1 and #2), the DL/UL configurations that are applicable to each transmitting/receiving point are by no means limited to these. Also, the DL/UL configurations that are applied to each transmitting/receiving point may be changed semi-statically or dynamically depending on the communication environment and so on.

First Example

The interference estimation method according to a first example of the present embodiment will be described. With the interference estimation method according to the first example, interference estimation resource information to indicate the above-noted interference estimation resources is reported, and the interference level in these interference estimation resources is estimated.

Figure 4:
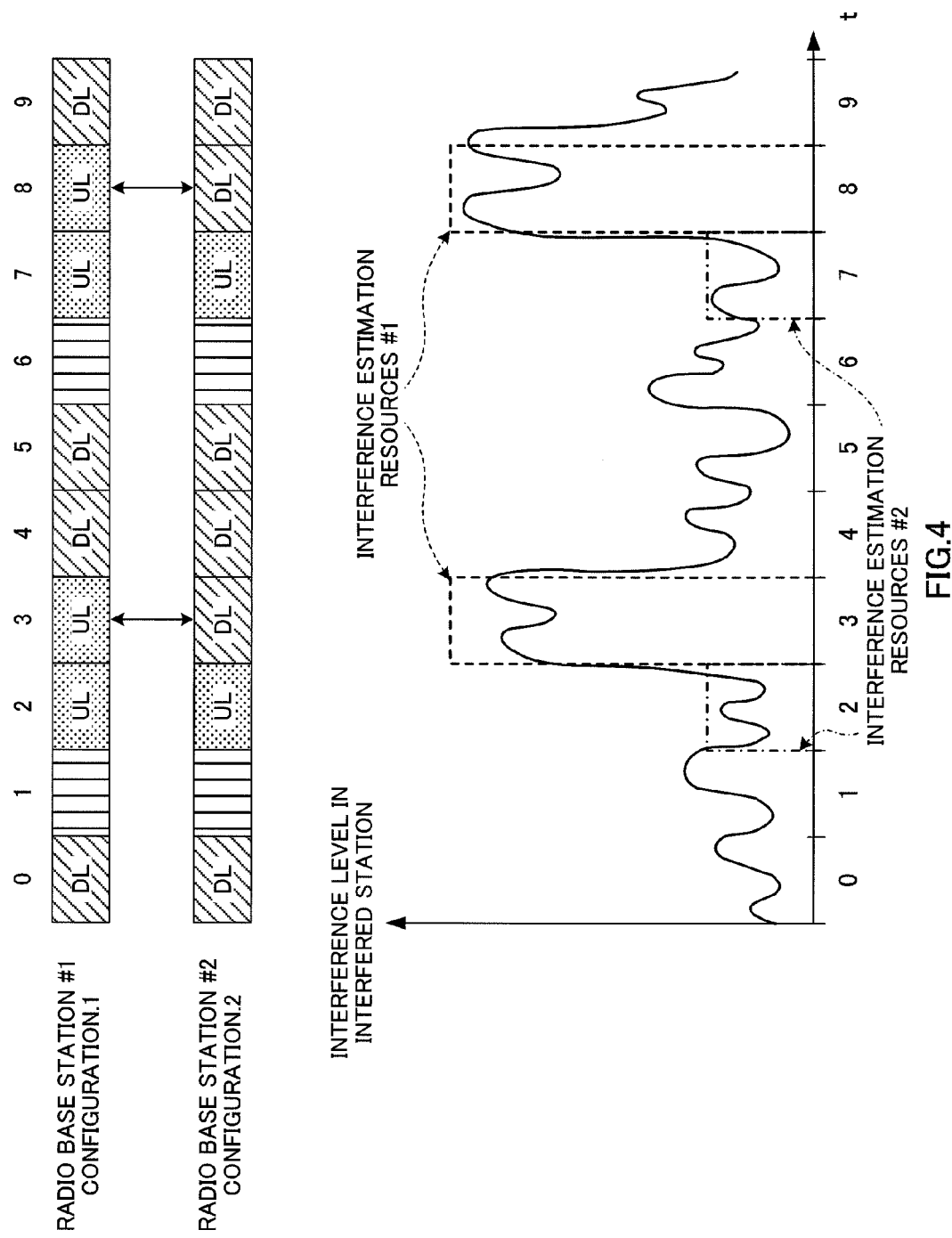
FIG. 4 is a diagram to show the relationship between interference estimation resources and the interference level according to a first example.

FIG. 4 is a diagram to show the relationship between interference estimation resources and the interference level according to the first example. FIG. 4 shows examples of interference levels in interference estimation resources when DL/UL configurations 1 and 2 are applied to radio base stations #1 and #2, respectively.

In the case illustrated in FIG. 4, the interfered station (radio base station #1 or user terminal #2 in FIG. 2A) receives interference estimation resource information that indicates interference estimation resources #1 and #2, and estimates the interference level in interference estimation resource #1 and #2. For this interference level, for example, the path loss, penetration loss and antenna gain of received signals in the interfered station (uplink signals for radio base station #1 or downlink signals for user terminal #2 in FIG. 2A) may be estimated.

Interference estimation resources #1 and #2 are determined based on, for example, the DL/UL configurations that are applied to radio base stations #1 and #2, and are reported to the interfered station. For example, in the case illustrated in FIG. 4, interference estimation resources #1 are specified by means of subframes #3 and #8, in which UL/DL varies between radio base stations #1 and #2, and the bandwidth of the interfered station. Also, interference estimation resources #2 are specified by means of subframes #2 and #7, in which UL is applied alike to both radio base stations #1 and #2, and the bandwidth of the interfered station.

In FIG. 4, in subframes #3 and #8 of interference estimation resources #1, UL/DL is applied differently between radio base stations #1 and #2, and therefore interference is produced between uplink signals and downlink signals, and the interference level in the interfered station (radio base station #1 or user terminal #2 in FIG. 2A) becomes relatively high. Meanwhile, in subframes #2 and #7 of interference estimation resource #2, UL is applied alike to radio base stations #1 and #2, so that interference is not produced between uplink signals and downlink signals, and the interference level in the interfered station becomes relatively low.

Note that, in FIG. 4, the average per subframe #3 and #8 may be used as the interference level in interference estimation resources #1. Similarly, the average per subframe #2 and #7 may be used as the interference level in interference estimation resources #2. In this way, the interference level in interference estimation resources may be the average taken in predetermined time regions/frequency regions that constitute the interference estimation resources.

Also, although FIG. 4 shows two sets of interference estimation resources #1 and #2, the number of interference estimation resources is not limited to this. Also, although, in FIG. 4, interference estimation resources #1 and #2 each include two subframes, the number of subframes to be included in each interference estimation resource is by no means limited to this. Also, although, in FIG. 4, interference estimation resources #1 and #2 are formed with the bandwidth of the interfered station, the frequency region is by no means limited to this.

Next, the interference estimation method according to the first example using interference estimation resources such as above will be described in detail. FIG. 5 to FIG. 8 are sequence diagrams to show the interference estimation method according to the first example. Assume that, in FIG. 5 to FIG. 8, radio base stations #1 and #2 adopt varying DL/UL configurations 1 and 2.

Figure 5:
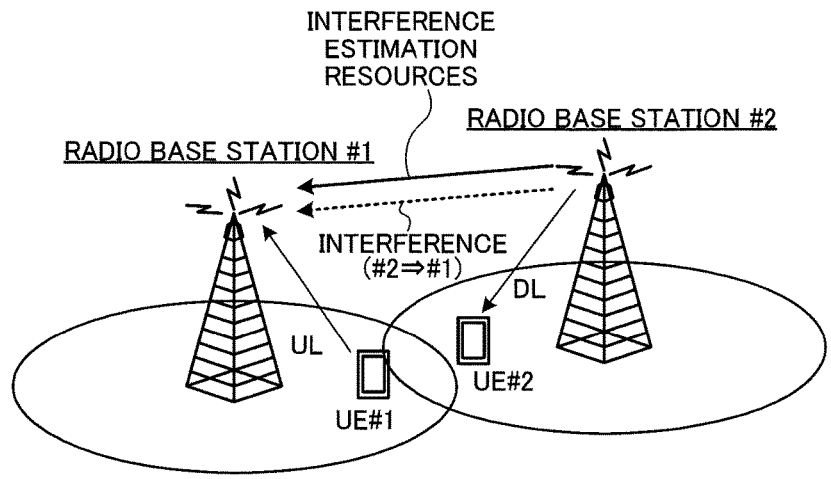
FIG. 5 is a sequence diagram to show an interference estimation method according to the first example.
Figure 5:
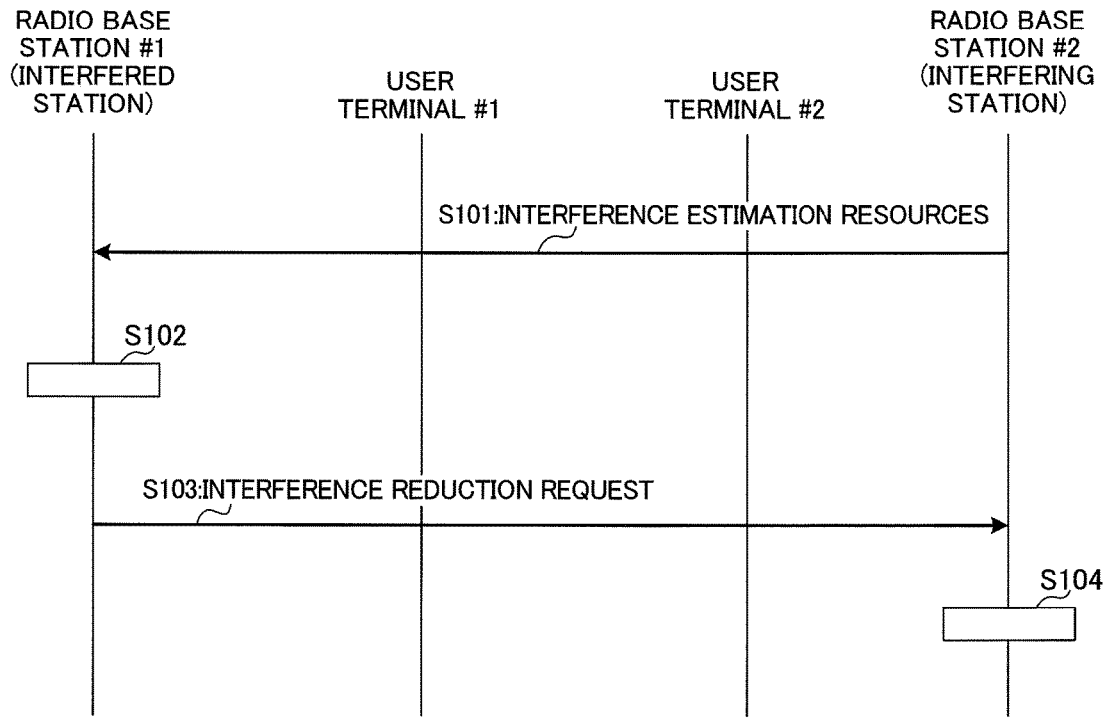
Figure 6:
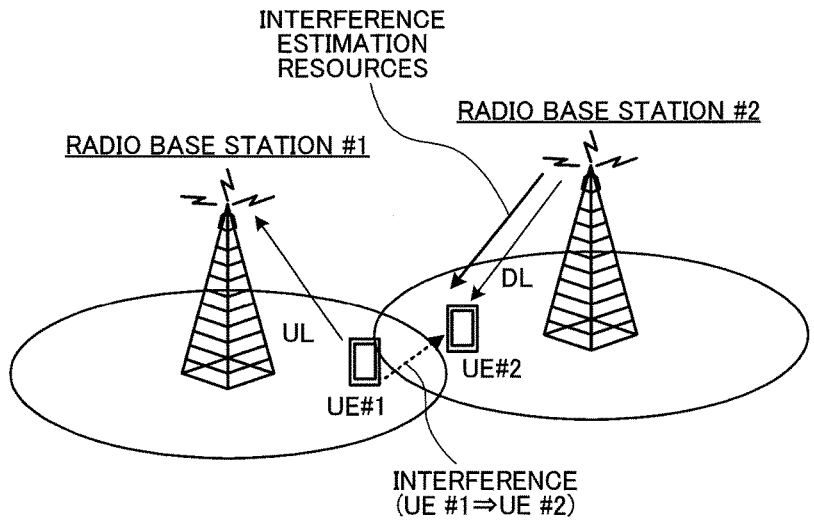
FIG. 6 is a sequence diagram to show an interference estimation method according to the first example.
Figure 6:
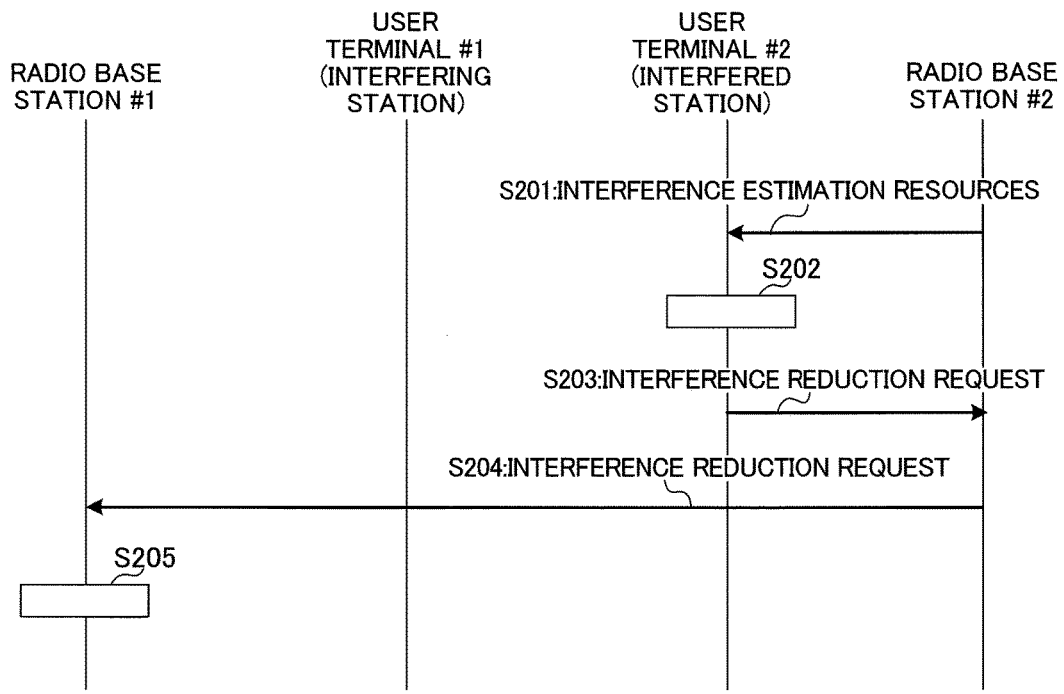

FIG. 5 and FIG. 6 show cases where interference estimation resources are reported from radio base station #2. FIG. 5 shows an interference estimation method for interference which uplink signals from user terminal #1 to radio base station #1 suffer. That is, in FIG. 5, radio base station #1 is the interfered station, and radio base station #2 is the interfering station.

As shown in FIG. 5, radio base station #2 reports the above-described interference estimation resources to radio base station #1 via a wired link such as an X2 interface (step S101). Note that the interference estimation resources may be reported either through semi-static signaling or through dynamic signaling.

Also, in step S101, radio base station #2 may report the above-described interference estimation resources to radio base station #1 via a wireless link. In this case, the interference estimation resources may be reported by means of semi-static signaling of broadcast signals, higher layer signals and so on (for example, RRC signaling), or may be reported through dynamic signaling using control signals such as a downlink control channel (PDCCH: Physical Downlink Control Channel, hereinafter referred to as "PDCCH"), an enhanced downlink control channel (ePDCCH: enhanced PDCCH, hereinafter referred to as "ePDCCH," and also referred to as "E-PDCCH," "UE-PDCCH" and so on).

Radio base station #1 estimates the interference level in the interference estimation resources reported from radio base station #2 (step S102). To be more specific, radio base station #1 estimates the interference levels in interference estimation resources #1 and #2 shown in FIG. 4.

Radio base station #1 transmits an interference reduction request for radio base station #2 based on the interference levels in the interference estimation resources (step S103). To be more specific, when the interference level in the interference estimation resources exceeds a predetermined threshold value, radio base station #1 transmits an interference reduction request for radio base station #2.

Here, the interference reduction request is used by the interfered station (radio base station #1 in FIG. 5) to request the interfering station (radio base station #2 in FIG. 5) to reduce interference, and is used, for example, to request the interfering station to adopt the same DL/UL configuration as in the interfered station, to request the interfering station to lower the transmission power, and so on.

Radio base station #2 performs an interference reduction process in response to the interference reduction request from radio base station #1 (step S104). To be more specific, in response to the request from radio base station #1, radio base station #2 adopts the same DL/UL configuration as in radio base station #1, lowers the transmission power of downlink signals for user terminal #2, and so on.

FIG. 6 shows an interference estimation method for interference which downlink signals from radio base station #2 to user terminal #2 receive. That is, in FIG. 6, user terminal #2 is the interfered station, and user terminal #1 is the interfering station.

As shown in FIG. 6, radio base station #2 reports the above-described interference estimation resources to user terminal #2 via a wireless link (step S201). Note that the interference estimation resources may be reported using semi-static signaling of broadcast signals, higher layer signals and so on (for example, RRC signaling), or may be reported by means of dynamic signaling using control channels such as the PDCCH and the ePDCCH.

User terminal #2 estimates the interference level in the interference estimation resources reported from radio base station #2 (step S202). To be more specific, user terminal #2 estimates the interference level in interference estimation resources #1 and #2 shown in FIG. 4.

User terminal #2 transmits an interference reduction request for user terminal #1 to radio base station #2 based on the interference level in the interference estimation resources (step S203). To be more specific, when the interference level in the interference estimation resources exceeds a predetermined threshold value, user terminal #2 transmits the above interference reduction request to radio base station #2. Radio base station #2 transfers the above interference reduction request to radio base station #1 to which user terminal #1 (interfering station) is connected (step S204).

In response to the interference reduction request from user terminal #2, radio base station #1 performs an interference reduction process (step S205). To be more specific, in response to the request from user terminal #2, radio base station #1 adopts the same DL/UL configuration as in radio base station #2, requests user terminal #1 to lower the transmission power of uplink signals, and so on.

With the interference estimation method shown in FIG. 5 and FIG. 6, when different DL/UL configurations are applied between neighboring transmitting/receiving points, interference estimation resources are reported from radio base station #2 to the interfered station (radio base station #1 or user terminal #2), and the interference level in these interference estimation resources is estimated. Consequently, by means of autonomous control between radio base stations #1 and #2, it is possible to adequately estimate the interference level which the interfered station (radio base station #1 or user terminal #2) receives from the interfering station (radio base station #2 or user terminal #1).

Figure 7:
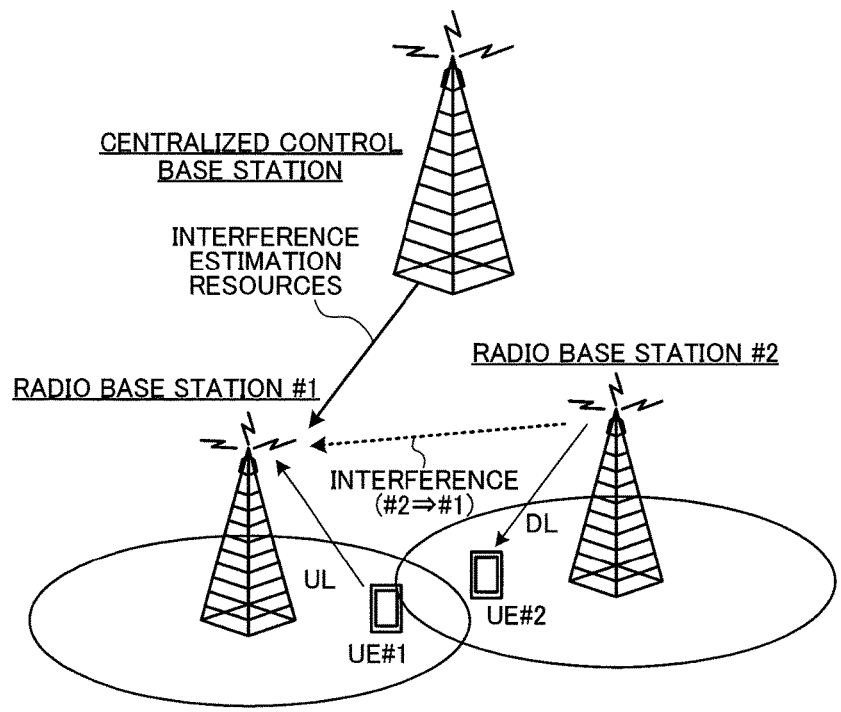
FIG. 7 is a sequence diagram to show an interference estimation method according to the first example.
Figure 7:
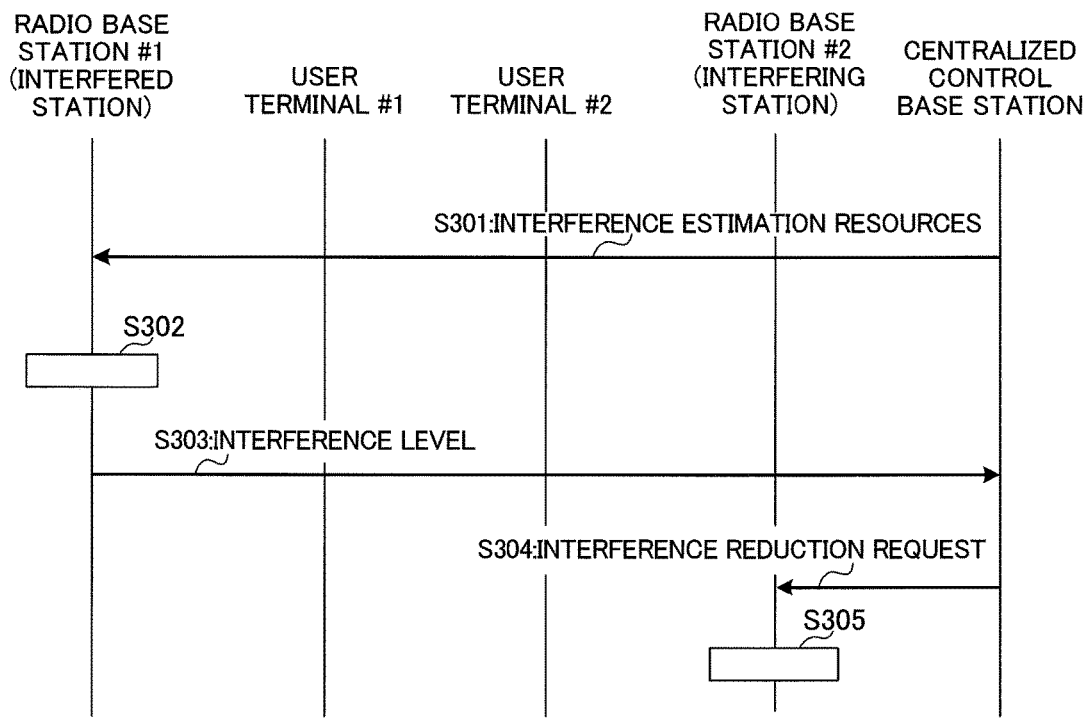
Figure 8:
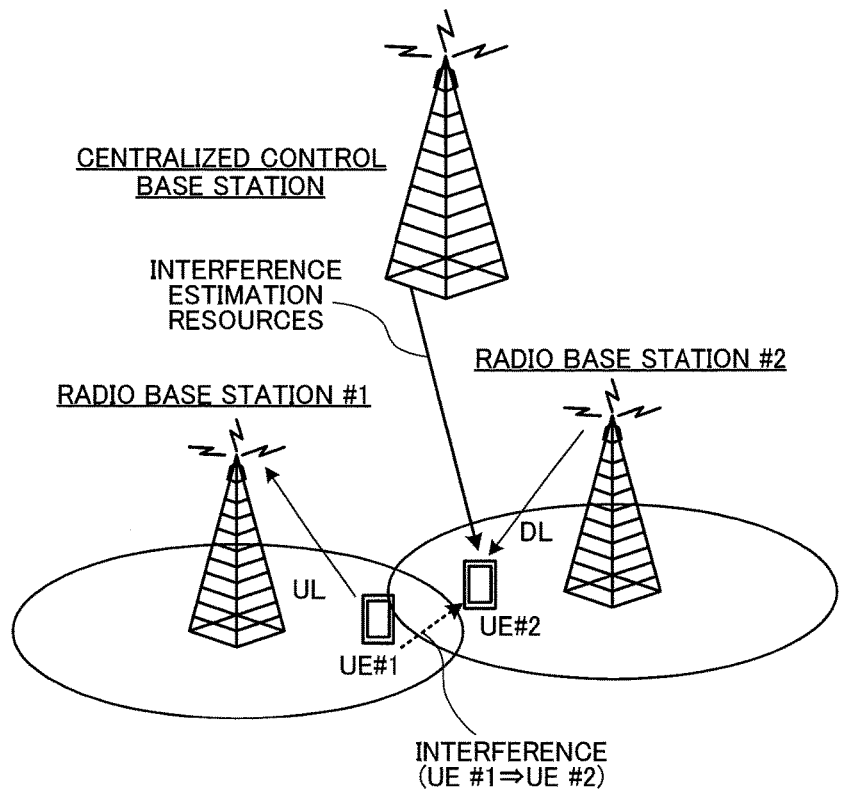
FIG. 8 is a sequence diagram to show an interference estimation method according to the first example.
Figure 8:
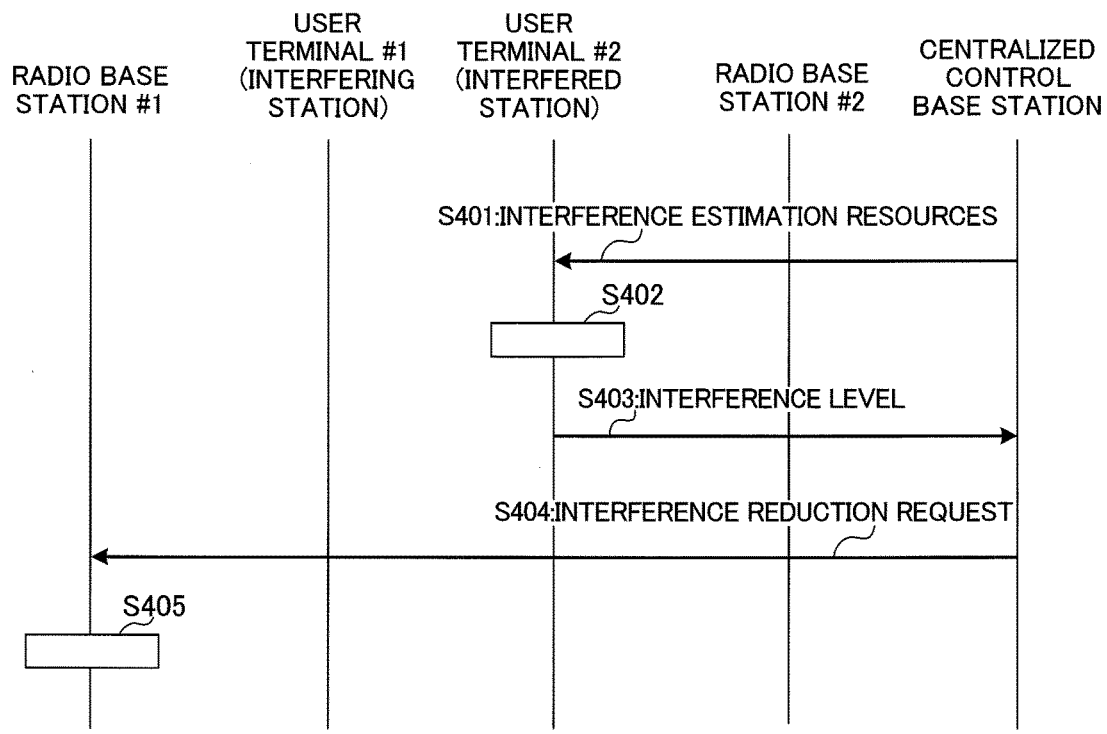

FIG. 7 and FIG. 8 show cases where interference estimation resources are reported from a centralized control base station. A centralized control base station refers to a control station that controls radio base stations #1 and #2. This centralized control base station may be a radio base station, or may be a device that is provided higher above the radio base station.

FIG. 7 shows an interference estimation method for interference which uplink signals from user terminal #1 to radio base station #1 suffer. That is, in FIG. 7, radio base station #1 is the interfered station, and radio base station #2 is the interfering station.

As shown in FIG. 7, the centralized control base station reports the above-described interference estimation resources to radio base station #1 via a wired link such as an X2 interface (step S301). Note that the interference estimation resources may be reported either through semi-static signaling or through dynamic signaling.

Also, in step S301, the centralized control base station may report the above-described interference estimation resources to radio base station #1 via a wireless link. In this case, the interference estimation resources may be reported through semi-static signaling of broadcast signals, higher layer signals and so on (for example, RRC signaling), or may be reported through dynamic signaling using control signals such as the PDCCH and the ePDCCH.

Radio base station #1 estimates the interference levels in the interference estimation resources reported from the centralized control base station (step S302). To be more specific, radio base station #1 estimates the interference levels in interference estimation resources #1 and #2 shown in FIG. 4.

Radio base station #1 reports the estimated interference level to the centralized control base station (step S303). The centralized control base station transmits an interference reduction request for radio base station #2 based on the interference level reported from radio base station #1 (step S304). To be more specific, when the interference level reported from radio base station #1 exceeds a predetermined threshold value, the centralized control base station transmits an interference reduction request for radio base station #2.

In response to the interference reduction request from the centralized control base station, radio base station #2 performs an interference reduction process (step S305). To be more specific, in response to the request from radio base station #1, radio base station #2 adopts the same DL/UL configuration as in radio base station #1, lowers the transmission power of downlink signals for user terminal #2, and so on.

FIG. 8 shows the interference method for interference which downlink signals from radio base station #2 to user terminal #2 suffer. That is, in FIG. 8, user terminal #2 is the interfered station, and user terminal #1 is the interfering station.

As shown in FIG. 8, the centralized control base station reports the above-described interference estimation resources to user terminal #2 via a wireless link with user terminal #2 (step S401). Note that the interference estimation resources may be reported using semi-static signaling of broadcast signals, higher layer signals and so on (for example, RRC signaling), or may be reported by means of dynamic signaling using control channels such as the PDCCH and the ePDCCH. Also, the centralized control base station may report the above-described interference estimation resources to user terminal #2 via radio base station #2.

User terminal #2 estimates the interference level in the interference estimation resources reported from the centralized control base station (step S402). To be more specific, user terminal #2 estimates the interference level in interference estimation resources #1 and #2 shown in FIG. 4.

User terminal #2 reports the estimated interference level to the centralized control base station (step S403). Note that user terminal #2 may report the estimated interference level to the centralized control base station directly via a wireless link with the centralized control base station, or report this to the centralized control base station via radio base station #2 to which user terminal #2 is connected.

The centralized control base station transmits interference reduction request for user terminal #1 to radio base station #1 based on the interference level reported from user terminal #2 (step S404). To be more specific, when the interference level reported from user terminal #2 exceeds a predetermined threshold value, the centralized control base station transmits an interference reduction request for user terminal #1.

In response to the interference reduction request for user terminal #1 from the centralized control base station, radio base station #1 performs an interference reduction process (step S405). To be more specific, in response to the request from the centralized control base station, radio base station #1 adopts the same DL/UL configuration as in radio base station #2, requests user terminal #1 to lower the transmission power of uplink signals and so on.

With the interference estimation method shown in FIG. 7 and FIG. 8, when different DL/UL configurations are applied between neighboring transmitting/receiving points, interference estimation resources are reported from the centralized control base station to the interfered station (radio base station #1 or user terminal #2), and the interference level in these interference estimation resources is estimated. Consequently, by means of the centralized control by the centralized control base station, it is possible to adequately estimate the interference level which the interfered station (radio base station #1 or user terminal #2) suffers from the interfering station (radio base station #2 or user terminal #1).

As has been described above, with the interference estimation method according to the first example, interference estimation resources are reported from radio base station #2 or the centralized control base station to the interfered station, and the interference level in these interference estimation resources is estimated. Consequently, it is possible to adequately estimate the interference level which the interfered station receives from the interfering station, and reduce the impact of interference in the interfered station. Also, since the radio resources where the interference level should be estimated are designated by the interference estimation resource information, it is possible to simplify the process of estimating the interference level in the interfered station.

Second Example

The interference estimation method according to a second example of the present embodiment will be described. With the interference estimation method according to the second example, interference estimation resource information to indicate the above-described interference estimation reference resources is reported, and the interference level in specific radio resources (hereinafter referred to as "specific resources") that are determined based on these interference estimation reference resources is estimated.

That is, the interference estimation method according to the second example is different from the first example in that interference estimation reference resources that serve as reference points upon estimating the interference level are reported instead of interference estimation resources. Now, the interference estimation method according to the second example will be described, primarily focusing on differences from the interference estimation method according to the first example.

Figure 9:
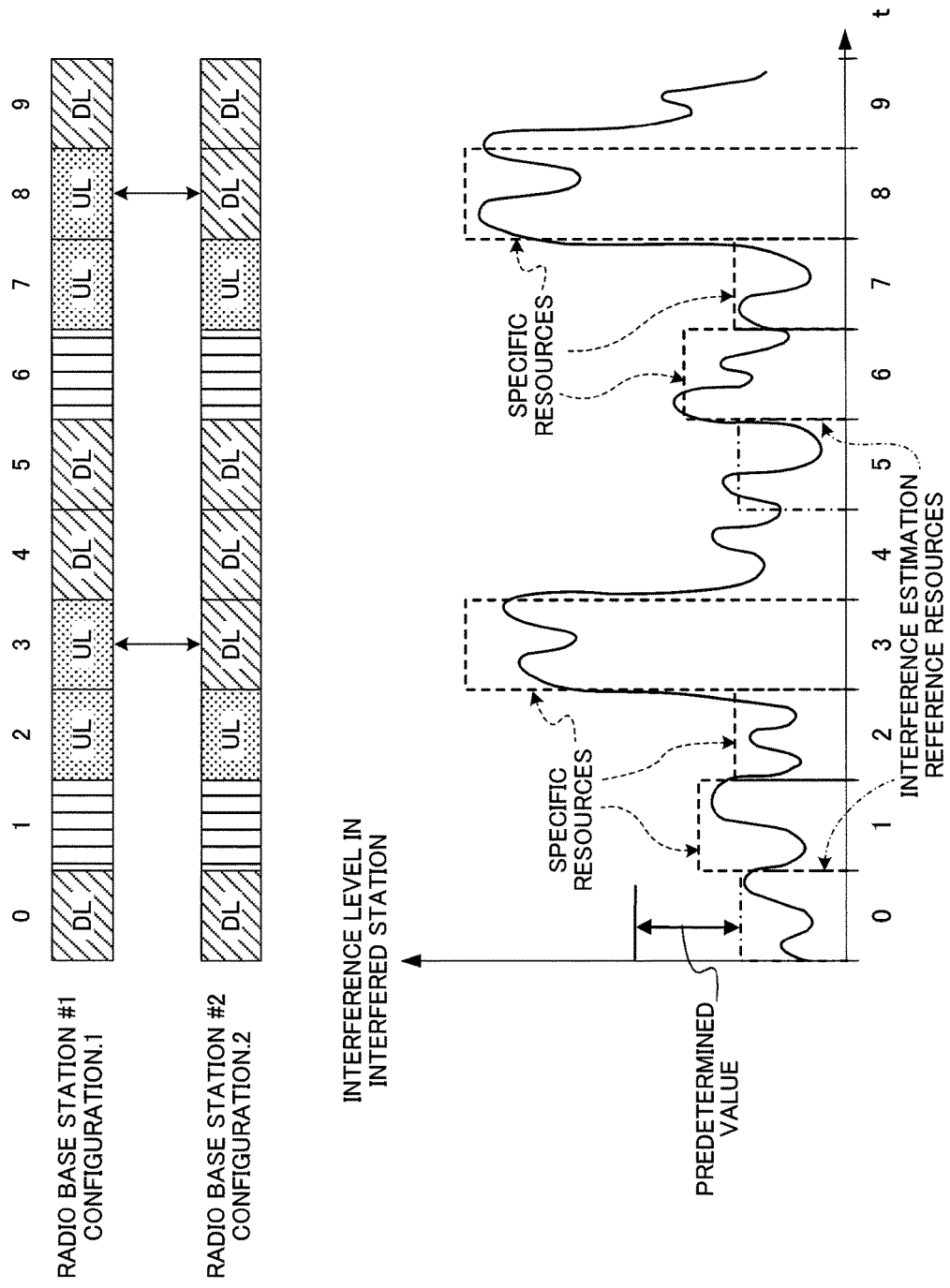
FIG. 9 is a diagram to show the relationship between interference estimation reference resources and the interference level according to a second example.

FIG. 9 is a diagram to show the relationship between interference estimation reference resources and the interference level according to the second example. FIG. 9 shows examples of the interference level in interference estimation reference resources and specific resources when DL/UL configurations 1 and 2 are applied to radio base stations #1 and #2, respectively.

In the case illustrated in FIG. 9, the interfered station (radio base station #1 or user terminal #2 in FIG. 2A) receives interference estimation resource information that indicates interference estimation reference resources, and determines specific resources based on these interference estimation reference resources, and estimates the interference level in the determined specific resources. The interference estimation reference resources may be radio resources that are defined in advance (for example, radio resources that are specified by subframes of predetermined index numbers in a radio frame, and by the bandwidth of the interfered station), or may be determined based on the DL/UL configurations applied to radio base stations #1 and #2.

Also, as specific resources, for example, n subframes preceding or following the interference estimation reference resources may be determined. Note that this predetermined parameter n is a positive integer. This parameter n may be stored in the interfered station in advance, or may be reported to the interfered station with the interference estimation reference resources.

In the case illustrated in FIG. 9, interference estimation reference resources are determined by subframes #0 and #5 and by the bandwidth of the interfered station. The interfered station (radio base station #1 or user terminal #2 in FIG. 2A) estimates the interference level in these interference estimation reference resources. Note that the average per subframe #0 and #5 may be used as the interference level in the interference estimation reference resources.

Also, in the case illustrated in FIG. 9, as specific resources, three subframes following the interference estimation reference resources (that is, subframes #1 to #3 and #6 to #8) are determined. In the interfered station (radio base station #1 or user terminal #2 in FIG. 2A), the interference level in these specific resources is also estimated. For interference level in the specific resources, the average of each subframe may be used. Note that the averaging unit is not limited to subframes, and has only to be a predetermined time domain unit or frequency domain unit.

Also, although, in FIG. 9, the interference estimation reference resources include two subframes, the number of subframes to be included in interference estimation reference resources is by no means limited to this. Also, although, in FIG. 9, the interference estimation reference resources are formed with the bandwidth of the interfered station, this frequency region is by no means limiting. Similarly, the specific resources are not limited to the ones shown in FIG. 9 either.

Figure 10:
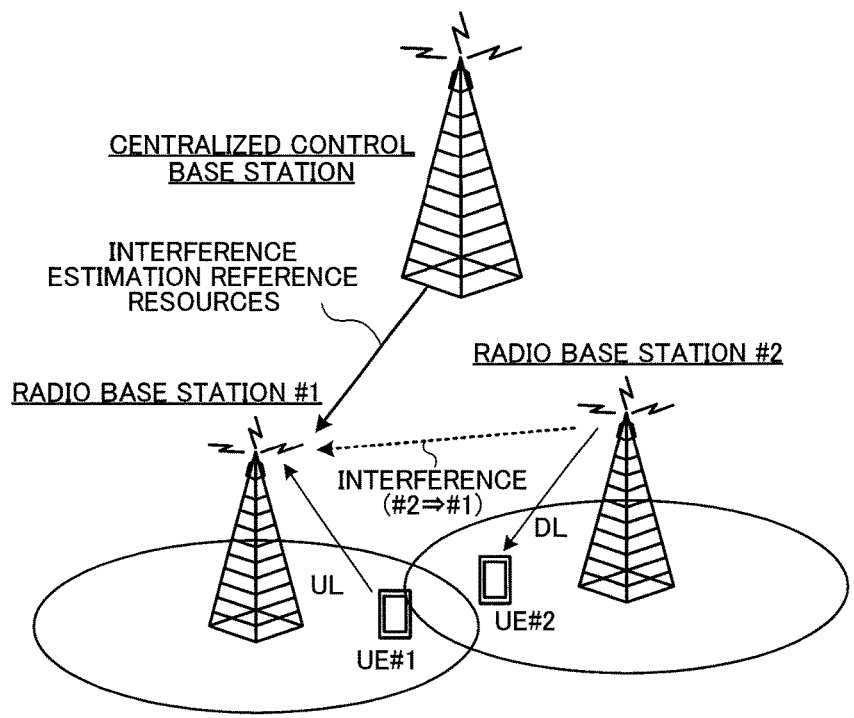
FIG. 10 is a sequence diagram to show an interference estimation method according to the second example.
Figure 10:
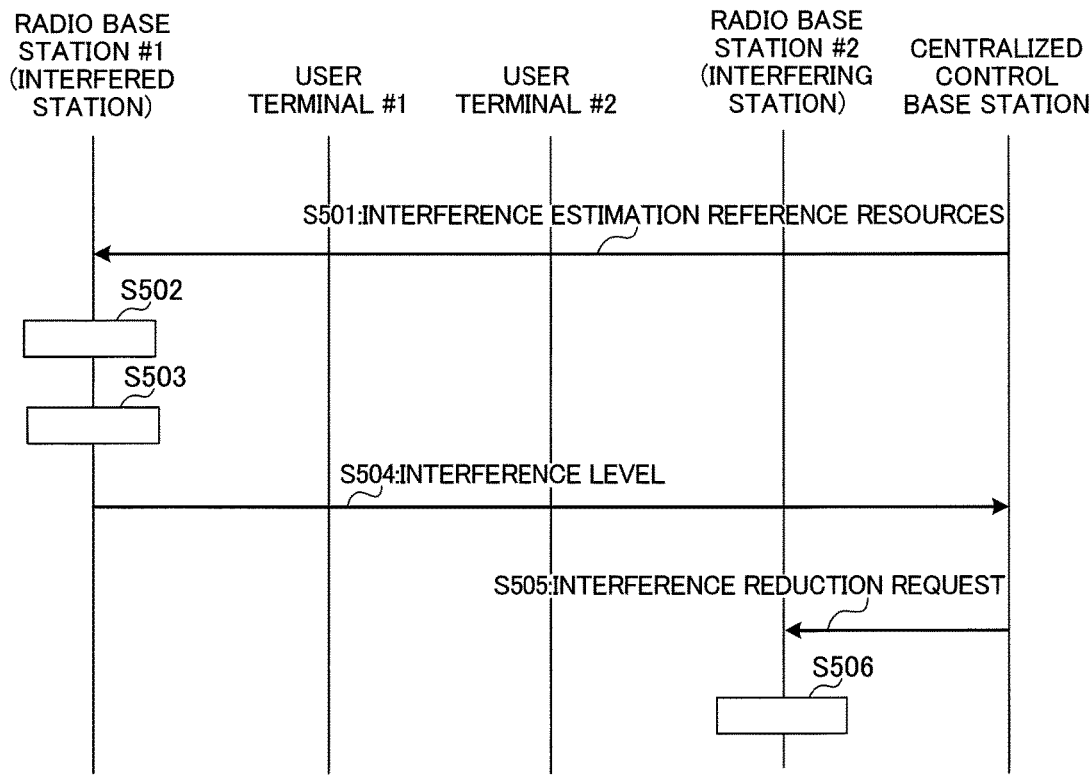
Figure 11:
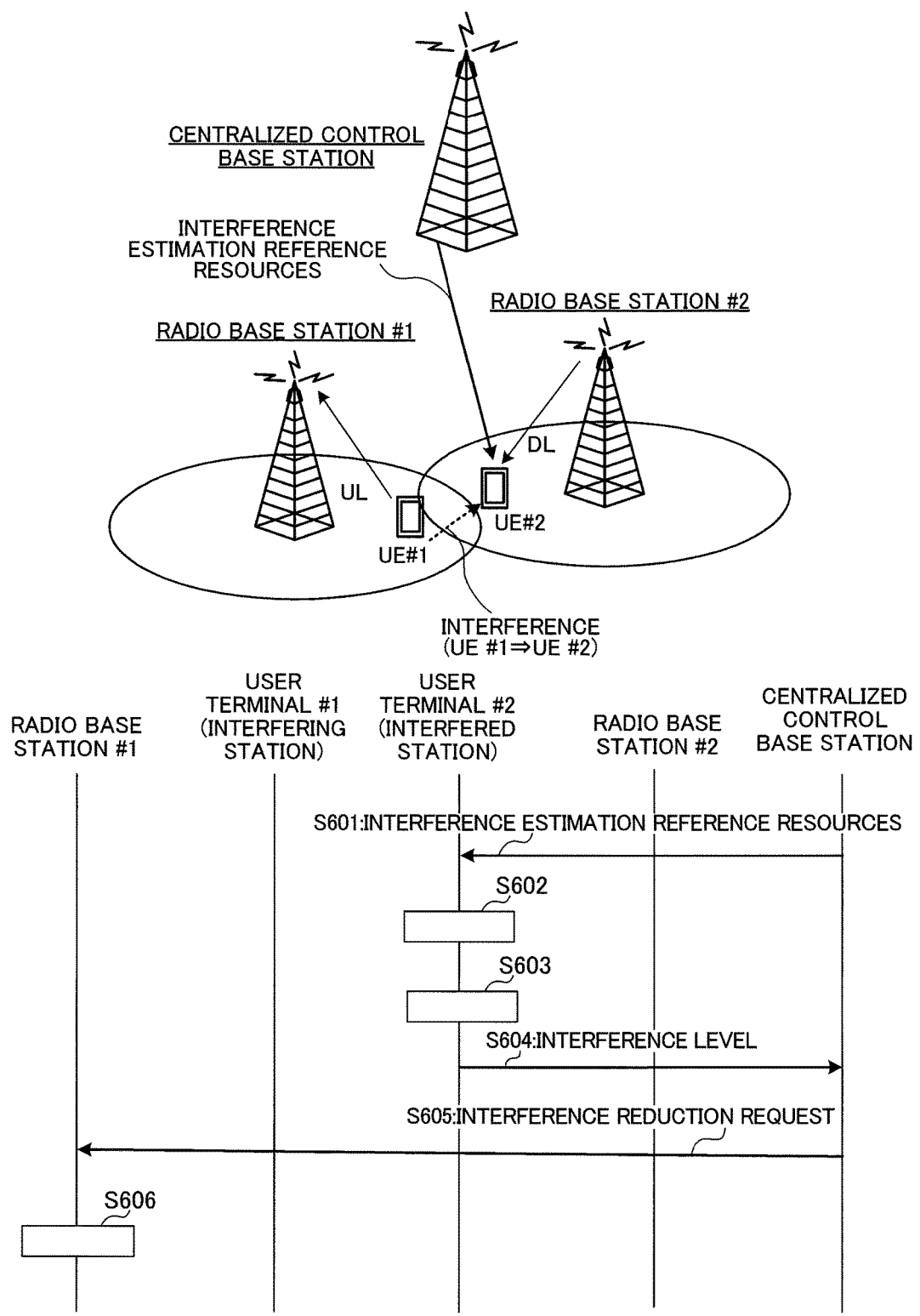
FIG. 11 is a sequence diagram to show an interference estimation method according to the second example.

Next, the interference estimation method according to the second example using interference estimation resources such as described above will be described in detail. FIG. 10 and FIG. 11 are sequence diagrams to show the interference estimation method according to the second example. Assume that, in FIG. 10 and FIG. 11, radio base stations #1 and #2 adopt DL/UL configurations 1 and 2, respectively.

FIG. 10 and FIG. 11 illustrate cases where interference estimation resources are reported from a centralized control base station. FIG. 10 shows an interference estimation method for interference which uplink signals from user terminal #1 to radio base station #1 receive. That is, in FIG. 10, radio base station #1 is the interfered station, and radio base station #2 is the interfering station.

As shown in FIG. 10, the centralized control base station reports the above-described interference estimation reference resources to radio base station #1 via a wired link such as an X2 interface (step S501). Note that the interference estimation reference resources may be reported either through semi-static signaling or through dynamic signaling.

Also, in step S501, the centralized control base station may report the above-described interference estimation reference resources to radio base station #1 via a wireless link. In this case, the interference estimation reference resources may be reported through semi-static signaling of broadcast signals, higher layer signals (for example, RRC signaling) and so on, or may be reported through dynamic signaling using control signals such as the PDCCH and the ePDCCH.

Radio base station #1 estimates the interference level in the interference estimation reference resources reported from the centralized control base station (step S502). To be more specific, radio base station #1 estimates the interference level in the interference estimation reference resources shown in FIG. 9 (that is, radio resources specified by subframes #0 and #5 and by the bandwidth of radio base station #1).

Radio base station #1 determines specific resources based on the interference estimation reference resources reported from the centralized control base station, and estimates the interference level in the determined specific resources (step S503). For example, in the case illustrated in FIG. 9, radio base station #1 determines three subframes #1 to #3 and #6 to #8 following subframes #0 and #5, which are the interference estimation reference resources, respectively, as specific resources. Radio base station #1 estimates the interference level in subframes #1 to #3 and #6 to #8 determined as specific resources.

Radio base station #1 reports the interference level in the specific resources estimated in step S503 to the centralized control base station (step S504). To be more specific, radio base station #1 reports the interference level in specific resources shown in FIG. 9 (that is, radio resources that are specified by subframes #1 to #3 and #6 to #8 and the bandwidth of radio base station #1) to the centralized control base station.

The centralized control base station transmits an interference reduction request for radio base station #2 based on the interference level reported from radio base station #1 (step S505). To be more specific, when the interference level reported from radio base station #1 exceeds a predetermined threshold value, the centralized control base station transmits an interference reduction request for radio base station #2.

In response to the interference reduction request from the centralized control base station, radio base station #2 performs an interference reduction process (step S506). To be more specific, in response to the request from radio base station #1, radio base station #2 adopts the same DL/UL configuration as in radio base station #1, lowers the transmission power of downlink signals for user terminal #2, and so on.

Note that, in step S504 in FIG. 10, when the interference level in specific resources fulfills predetermined conditions the interference level in the interference estimation reference resources, radio base station #1 may report the interference level in these specific resources to the centralized control base station. For example, when the interference level in specific resources is greater than the interference level given by adding a predetermined value to the interference level in the interference estimation reference resources, radio base station #1 may report the interference level in the specific resources to the centralized control base station.

For example, the interference level in subframes #1 and #2, #6 and #7, which are the specific resources shown in FIG. 9, is lower than the interference level given by adding a predetermined value to the interference level in subframes #0 and #5, which are the interference estimation reference resources. On the other hand, the interference level in subframes #3 and #8, which are the specific resources shown in FIG. 9, is greater than the interference level given by adding a predetermined value to the interference level in subframes #0 and #5. In this case, radio base station #1 may report only the interference level in subframes #3 and #8 to the centralized control base station.

Also, in step S504 of FIG. 10, radio base station #1 may report the difference between the interference level in specific resources and the interference level in the interference estimation reference resources to the centralized control base station. For example, in the case illustrated in FIG. 9, radio base station #1 reports the differences between the interference levels in subframes #1 to #3 and #6 to #8, which are the specific resources, and the interference levels in subframes #0 and #5, which are the interference estimation reference resources, to the centralized control base station.

FIG. 11 shows an interference estimation method for interference which downlink signals from radio base station #2 to user terminal #2 receive. That is, in FIG. 11, user terminal #2 is the interfered station, and user terminal #1 is the interfering station.

As shown in FIG. 11, the centralized control base station reports the above-described interference estimation reference resources to user terminal #2 via a wireless link with user terminal #2 (step S601). Note that the interference estimation reference resources may be reported through semi-static signaling of broadcast signals, higher layer signals and so on (for example, RRC signaling), or may be reported through dynamic signaling using control signals such as the PDCCH and the ePDCCH. Also, the centralized control base station may report the above-described interference estimation reference resources to user terminal #2 via radio base station #2.

User terminal #2 estimates the interference level in the interference estimation reference resources reported from the centralized control base station (step S602). To be more specific, radio base station #1 estimates the interference level in the interference estimation reference resources shown in FIG. 9 (that is, radio resources specified by subframes #0 and #5 and by the bandwidth of user terminal #2).

User terminal #2 determines specific resources based on the interference estimation reference resources reported from the centralized control base station, and estimates the interference level in the determined specific resources (step S603). For example, in the case illustrated in FIG. 9, user terminal #2 determines three subframes #1 to #3 and #6 to #8 following subframes #0 and #5, which are the interference estimation reference resources, respectively, as specific resources. User terminal #2 estimates the interference level in subframes #1 to #3 and #6 to #8 determined as specific resources.

User terminal #2 reports the interference level in the specific resources estimated in step S603 to the centralized control base station (step S604). To be more specific, user terminal #2 reports the interference level in specific resources shown in FIG. 9 (that is, radio resources that are specified by subframes #1 to #3 and #6 to #8 and the bandwidth of user terminal #2) to the centralized control base station.

The centralized control base station transmits an interference reduction request for user terminal #1 based on the interference level reported from user terminal #2 (step S605). To be more specific, when the interference level reported from user terminal #2 exceeds a predetermined threshold value, the centralized control base station transmits an interference reduction request for user terminal #1.

In response to the interference reduction request for user terminal #1 from the centralized control base station, radio base station #1 performs an interference reduction process (step S606). To be more specific, in response to the request from the centralized control base station, radio base station #1 adopts the same DL/UL configuration as in radio base station #2, requests user terminal #1 to lower the transmission power of uplink signals, and so on.

Note that, in step S604 in FIG. 11, when the interference level in specific resources fulfills predetermined conditions based on the interference level in the interference estimation reference resources, user terminal #2 may report the interference level in these specific resources to the centralized control base station. For example, when the interference level in specific resources is greater than the interference level given by adding a predetermined value to the interference level in the interference estimation reference resources, user terminal #2 may report the interference level in the specific resources to the centralized control base station.

For example, the interference level in subframes #1 and #2, #6 and #7, which are the specific resources shown in FIG. 9, is lower than the interference level given by adding a predetermined value to the interference level in subframes #0 and #5, which are the interference estimation reference resources. On the other hand, the interference level in subframes #3 and #8, which are the specific resources shown in FIG. 9, is greater than the interference level given by adding a predetermined value to the interference level in subframes #0 and #5. In this case, user terminal #2 reports only the interference level in subframes #3 and #8 to the centralized control base station.

Also, in step S604 of FIG. 11, user terminal #2 may report the difference between the interference level in specific resources and the interference level in the interference estimation reference resources to the centralized control base station. For example, in the case illustrated in FIG. 9, user terminal #2 reports the differences between the interference levels in subframes #1 to #3 and #6 to #8, which are the specific resources, and the interference levels in subframes #0 and #5, which are the interference estimation reference resources, to the centralized control base station.

With the interference estimation methods shown in FIG. 10 and FIG. 11, when different DL/UL configurations are applied between neighboring transmitting/receiving points, interference estimation reference resources are reported from the centralized control base station to the interfered station (radio base station #1 or user terminal #2), and the interference level in specific resources determined based on the interference estimation resources is estimated. Consequently, by means of the centralized control by the centralized control base station, it is possible to adequately estimate the interference level which the interfered station (radio base station #1 or user terminal #2) receives from the interfering station (radio base station #2 or user terminal #1).

As has been described above, with the interference estimation method according to the second example, interference estimation reference resources are reported from radio base station #2 or the centralized control base station to the interfered station, and the interference level in specific resources, determined based on the interference estimation reference resources, is estimated. Consequently, it is possible to adequately estimate the interference level which the interfered station receives from the interfering station, and reduce the impact of interference in the interfered station. Also, since radio resources to serve as reference points upon estimating the interference level are designated by means of interference estimation resource information, it is possible to reduce the amount of signaling for the interfered station, which increases when, for example, the DL/UL configuration is changed frequently.

(Configuration of Radio Communication System)

An example of a radio communication system according to the present embodiment will be described.

Figure 12:
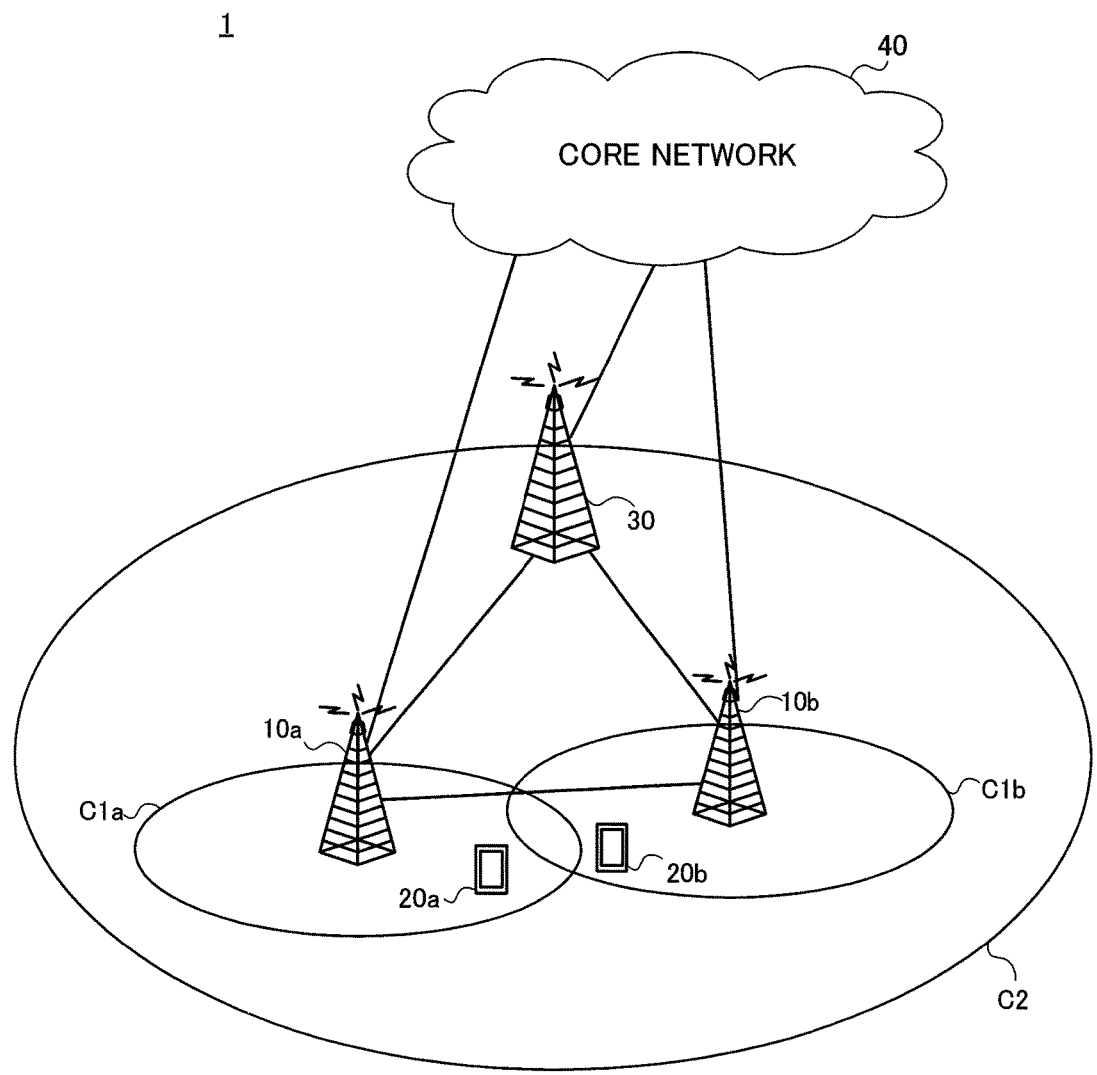
FIG. 12 is an overall configuration diagram of a radio communication system according to the present embodiment.

FIG. 12 is a diagram to explain an overall system configuration of a radio communication system according to the present embodiment. A radio communication system 1 adopts carrier aggregation to group a plurality of fundamental frequency blocks (component carriers) into one, where the system band of the LTE system is one unit. Note that the radio communication system 1 may be referred to as "LTE," "LTE-A (LTE-Advanced)" and "IMT-Advanced," or may be referred to as "4G," "FRA (Future Radio Access)" and so on.

As shown in FIG. 12, the radio communication system 1 includes a radio base station 10a that forms cell C1a, a radio base station 10b that is placed to neighbor the radio base station 10a and that forms cell C1b, and a centralized control base station 30 that forms cell C2 in which the radio base stations 10a and 10b are placed, and that controls the radio base stations 10a and 10b. In the radio communication system 1, user terminal 20a is configured to be able to perform radio communication with both the radio base station 10a and the centralized control base station 30. Also, the user terminal 20b is configured to be able to perform radio communication with both the radio base station 10b and the centralized control base station 30.

The radio base stations 10a and 10b are connected with each other via a wired link such as an X2 interface. Also, the radio base stations 10a and 10b are connected with the centralized control base station 30 via a wired link such as an X2 interface. Also, the radio base stations 10a and 10b and the centralized control base station 30 are each connected with a higher station apparatus (not illustrated) on the core network 40 (not illustrated). The higher station apparatus may be, for example, an access gateway apparatus, a mobility management entity (MME) and so on, but is by no means limited to these.

Note that, in FIG. 12, the radio base stations 10a and 10b may be connected with each other via a wireless link, or may be connected to the centralized control base station 30 via a wireless link. Also, the radio base stations 10a and 10b may be connected with a higher station apparatus on the core network 40 via the centralized control base station 30.

In the radio communication system 1, the radio base stations 10a and 10b may be radio base stations to be referred to as "eNodeBs," "transmitting/receiving points" and so on, or may be radio base stations that have local cover areas and that are referred to as "pico base stations," "femto base stations," "Home eNodeBs," "RRHs (Remote Radio Heads)," "micro base stations," "transmitting/receiving points" and so on. Hereinafter, the radio base stations 10a and 10b will be collectively referred to as "radio base station 10," unless distinction is drawn otherwise.

Also, in the radio communication system 1, the centralized control base station 30 is a control station to control the radio base stations 10a and 10b. The centralized control base station 30, as long as having the functions to control the radio base stations 10a and 10b, may be a radio base station referred to as "eNodeB," "transmitting/receiving point," and so on, or may be a different device (for example, a device provided on the core network 40, an RNC (Radio Network Controller) and so on). Note that, when autonomous control is executed between transmitting/receiving points (for example, in the cases illustrated in FIGS. 5 and 7), the centralized control base station 30 may be omitted.

Also, in the radio communication system 1, user terminals 20a and 20b are terminals that support various communication schemes such as LTE and LTE-A, and may be either mobile communication terminals or fixed communication terminals. Also, the user terminals 20a and 20b may be referred to as "transmitting/receiving points" and so on. Now, the user terminals 20a and 20b will be hereinafter collectively referred to as "user terminal 20" unless distinction is drawn otherwise.

Also, in the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Also, in the radio communication system 1, time division duplexing (TDD) is used as the duplexing scheme for radio communication between the radio base station 10 and the user terminal 20. As the duplexing scheme for radio communication between the centralized control base station 30 and the user terminal 20, either time division duplexing (TDD) or frequency division duplexing (FDD) may be used.

Here, communication channels used in the radio communication system 1 will be described. Downlink communication channels include a downlink shared data channel (PDSCH: Physical Downlink Shared Channel) that is used by each user terminal 20 on a shared basis, a downlink control channel (PDCCH: Physical Downlink Control Channel), an enhanced downlink control channel that is frequency-division-multiplexed with the PDSCH (ePDCCH: Enhanced Physical Downlink Control Channel, also referred to as "enhanced PDCCH," "E-PDCCH," "FDM-type PDCCH" and so on), a broadcast channel (BCH), and so on.

User data and higher layer signals (for example, RRC signaling) are transmitted by means of this PDSCH. Also, by at least one of the PDCCH and the ePDCCH, control information such as scheduling information for the PDSCH and the PUSCH and so on are transmitted. Also, broadcast signals of system information such as MIBs are transmitted by the BCH. Note that the broadcast signals to be transmitted in higher layer signals, the BCH and so on are subject to semi-static signaling, while the PDCCH and the ePDCCH are subject to dynamic signaling.

Uplink communication channels include an uplink data channel (PUSCH: Physical Uplink Shared Channel) that is used by each user terminal 20 on a shared basis, an uplink control channel (PUCCH: Physical Uplink Control Channel) and so on. By means of this PUSCH, user data and higher layer control information (for example, control information to be provided through RRC signaling) is transmitted. Also, downlink radio quality information (CQI: Channel Quality Indicator), ACK/NACK and so on are transmitted by the PUCCH.

Now, the detailed functional configurations of the radio communication system 1 according to the present embodiment will be described with reference to FIG. 13 to FIG. 15. Note that each device to constitute the radio communication system 1 (to be more specific, the radio base station 10, the user terminal 20, and the centralized control base station 30) has hardware including processors, memories, RF circuits, and so on, and, in the memories, software modules to be executed on the processors are memorized. The functional configurations described below may be implemented by means of the above hardware, may be implemented by software modules that are executed on the processors, or may be implemented by combinations of both.

Also, assume that, in the following description, in the radio communication system 1 shown in FIG. 12, uplink signals from the user terminal 20a (the first user terminal, user terminal #1) to the radio base station 10a (the first radio base station, radio base station #1), and downlink signals from the radio base station 10b (the second radio base station, radio base station #2) to the user terminal 20b (the second user terminal, user terminal #2) are transmitted using the time division duplexing (TDD) scheme. To be more specific, a case will be assumed where different DL/UL configurations are applied between the radio base stations 10a and 10b, so that the above uplink signals and downlink signals are transmitted in time regions and frequency regions that overlap at least in part.

Figure 13:
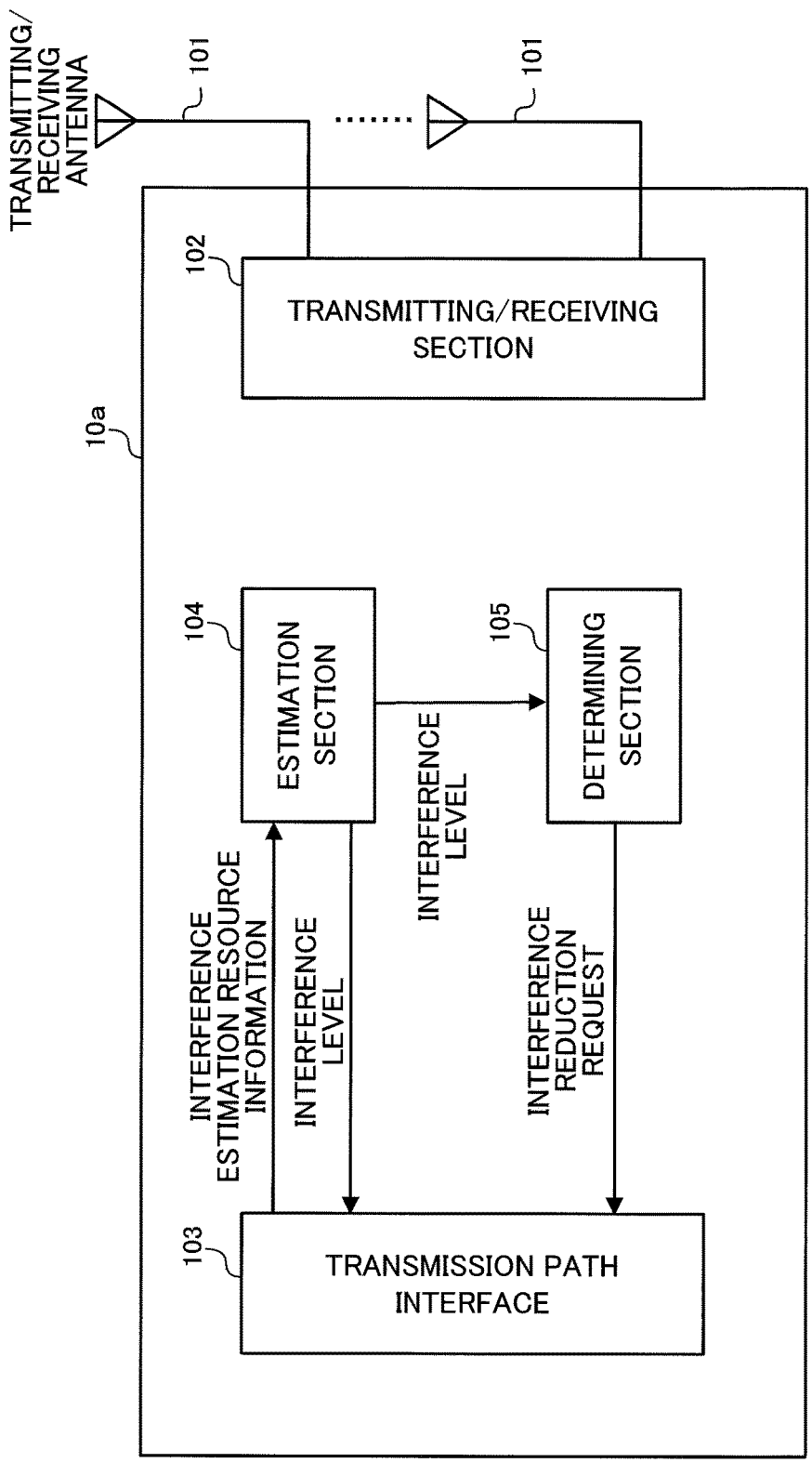
FIG. 13 is a functional configuration diagram of a radio base station according to the present embodiment.

FIG. 13 is a functional configuration diagram of the radio base stations 10 according to the present embodiment. Note that, with FIG. 13, the functional configurations of the radio base station 10a (interfered station), which is interfered with by the radio base station 10b (interfering station), will be described primarily. As shown in FIG. 13, the radio base station 10a has a plurality of transmitting/receiving antennas 101 for MIMO transmission, a transmitting/receiving section 102, a transmission path interface 103 (receiving section and transmitting section), an estimation section 104, and a determining section 105.

The transmitting/receiving section 102 receives uplink signals from the user terminal 20a via a plurality of transmitting/receiving antennas 101, and also transmits downlink signals for the user terminal 20a. To be more specific, the transmitting/receiving section 102 switches between the downlink and the uplink per predetermined time region (for example, per subframe) based on the DL/UL configuration (FIG. 1), and receives the uplink signals and transmits the downlink signals. Note that the DL/UL configuration may be changed semi-statically or dynamically. Also, the DL/UL configurations are by no means limited to the examples shown in FIG. 1.

The transmission path interface 103 is a communication interface to transmit and receive signals between the radio base station 10b or the centralized control base station 30. To be more specific, the transmission path interface 103 receives, from the radio base station 10b or the centralized control base station 30, interference estimation resource information that is used to estimate the interference level which uplink signals from the user terminal 20a to the radio base station 10a suffer.

Here, the interference estimation resource information that is received in the transmission path interface 103 may indicate interference estimation resources, which are the radio resources where the above interference level should be estimated (the above first example), or may indicate interference estimation reference resources, which are radio resources that serve as reference points upon estimating the above interference level (the above second example). As noted earlier, the interference estimation resources and the interference estimation reference resources are at least one of a predetermined time region and a frequency region. This interference estimation resource information is output from the transmission path interface 103 to the estimation section 104.

Also, the transmission path interface 103 transmits an interference reduction request that is input from the determining section 105, which will be described later, to the radio base station 10b (interfering station), or transmits the interference level that is estimated in the estimation section 104, which will be described later, to the centralized control base station 30.

To be more specific, with the above first example, when interference estimation resources are reported from the radio base station 10b (FIG. 5), the transmission path interface 103 transmits an interference reduction request (described later) that is input from the determining section 105, to the radio base station 10b. Also, when interference estimation resources are reported from the centralized control base station (FIG. 7), the transmission path interface 103 may transmit the interference level in these interference estimation resources to the centralized control base station 30.

On the other hand, with the above second example, when interference estimation reference resources are reported from the centralized control base station 30 (FIG. 9), the transmission path interface 103 may transmit the interference level in specific radio resources (hereinafter referred to as "specific resources") that are determined based on the interference estimation reference resources to the centralized control base station 30. Alternatively, when the interference level in the specific resources fulfills predetermined conditions based on the interference level in the interference estimation reference resources, the transmission path interface 103 may transmit the interference level in these specific resources to the centralized control base station 30. Alternatively, the transmission path interface 103 may transmit the difference between the interference level in the interference estimation reference resources and the interference level in the specific resources to the centralized control base station 30.

The estimation section 104 estimates the interference level which the uplink signals for the radio base station 10a suffer, based on the interference estimation resource information received in the transmission path interface 103. For this interference level, the path loss, penetration loss, or antenna gain of the uplink signals received in the transmitting/receiving section 102 may be estimated. Also, the interference level which the uplink signals for the radio base station 10a suffer may be the interference level caused by at least one of downlink signals from radio base station 10b to the user terminal 20b, and uplink signals from another user terminal that neighbors the radio base station 10a (this user terminal has only to be located near the radio base station 10a, and may be connected to the radio base station 10a or connected to another radio base station 10).

To be more specific, with the first example, the estimation section 104 estimates the above interference level in the interference estimation resources designated by the interference estimation resource information. The estimation section 104 may output the estimated interference level to the determining section 105 (FIG. 5) or to the transmission path interface 103 (FIG. 7).

Meanwhile, with the above second example, the estimation section 104 estimates the above interference level in specific resources determined based on interference estimation reference resources. These specific resources are determined based on interference estimation reference resources and a predetermined parameter (for example, "n," when n subframes following interference estimation reference resources are made specific resources). The predetermined parameter may be stored in advance, or may be reported from the radio base station 10b or the centralized control base station 30, along with the interference estimation reference resources. Also, the estimation section 104 may estimate the above interference level in the interference estimation reference resources. The estimation section 104 outputs the estimated interference level to the transmission path interface 103 (FIG. 9).

The determining section 105 determines whether or not to send an interference reduction request to the radio base station 10b (interfering station) based on the interference level estimated in the estimation section 104. To be more specific, when the interference level estimated in the estimation section 104 is greater than a predetermined threshold value, the determining section 105 determines sending an interference reduction request for the radio base station 10b, and outputs the interference reduction request to the transmission path interface 103. As has been described above, by the interference reduction request, the radio base station 10b is requested to adopt the same DL/UL configurations as in the radio base station 10a, lower the transmission power of downlink signals from the radio base station 10b and so on. Note that, in the above case of the second example, the determining section 105 may be omitted.

Figure 14:
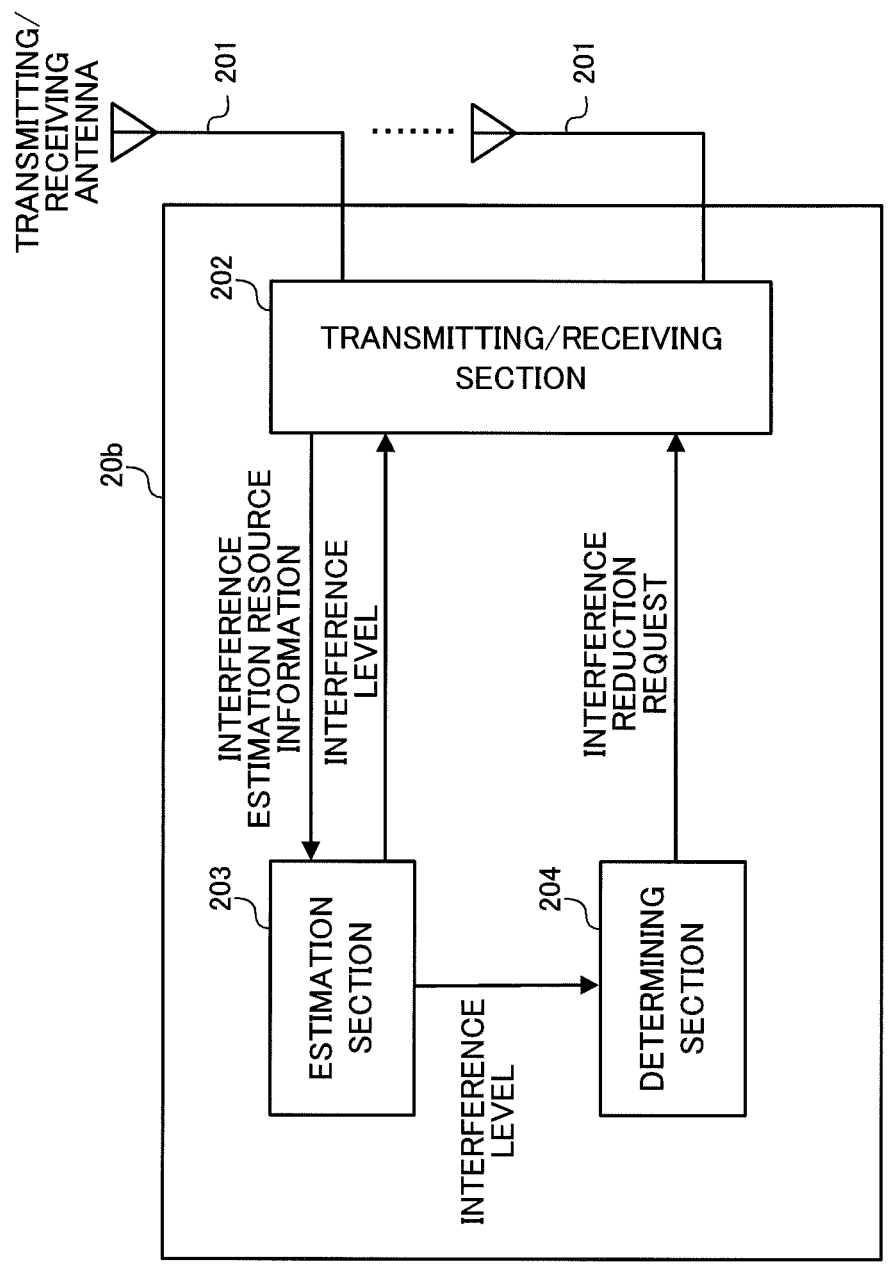
FIG. 14 is a functional configuration diagram of a user terminal according to the present embodiment.

FIG. 14 is a functional configuration diagram of user terminal 20 according to the present embodiment. Note that, in FIG. 14, the functional configurations of the user terminal 20b (interfered station), which is interfered with by the user terminal 20a (interfering station), will be primarily described. As shown in FIG. 14, the user terminal 20b has a plurality of transmitting/receiving antennas 201 for MIMO transmission, a transmitting/receiving section 202 (receiving section and transmission section), an estimation section 203, and a determining section 204.

The transmitting/receiving section 202 receives downlink signals from the radio base station 10b via a plurality of transmitting/receiving antennas 201, and also transmits uplink signals for the radio base station 10b. To be more specific, the transmitting/receiving section 202 switches between the downlink and the uplink per predetermined time domain (for example, per subframe) based on the DL/UL configurations (FIG. 1), and transmits the uplink signals and receives the downlink signals. Note that the DL/UL configurations may be changed semi-statically or dynamically. Also, the DL/UL configurations are not limited to the examples shown in FIG. 1.

Also, the transmitting/receiving section 202 receives interference estimation resource information that is used to estimate the interference level which downlink signals from the radio base station 10b or the centralized control base station 30 to the user terminal 20b receive. The transmitting/receiving section 202 may receive the interference estimation resource information through semi-static signaling of broadcast signals, higher layer signals and so on (for example, RRC signaling), or through dynamic signaling using control signals such as the PDCCH and the ePDCCH.

Here, the interference estimation resource information that is received in the transmitting/receiving section 202 may indicate interference estimation resources, which are the radio resources where the above interference level should be estimated (the above first example), or may indicate interference estimation reference resources, which are radio resources that serve as reference points upon estimating the above interference level (the above second example). This interference estimation resource information is output from the transmitting/receiving section 202 to the estimation section 203.

Also, the transmitting/receiving section 202 may transmit the interference reduction request that is input from the determining section 204, which will be described later, to the radio base station 10b (interfering station), or transmit the above interference level estimated in the estimation section 203, which will be described later, to the centralized control base station 30.

To be more specific, with the above first example, when interference estimation resources are reported from the radio base station 10b (FIG. 6), the transmitting/receiving section 202 transmits an interference reduction request (described later) input from the determining section 204, to the radio base station 10b. Also, when interference estimation resources are reported from the centralized control base station 30 (FIG. 8), the transmitting/receiving section 202 may transmit the interference level in these interference estimation resources to the centralized control base station 30.

Meanwhile, with the above second example, when interference estimation reference resources are reported from the centralized control base station 30 (FIG. 10), the transmitting/receiving section 202 may transmit the interference level in specific resources determined based on the interference estimation reference resources to the centralized control base station 30. Alternatively, when the interference level in the specific resources fulfills predetermined conditions based on the interference level in the interference estimation reference resources, the transmitting/receiving section 202 may transmit the interference level in these specific resources to the centralized control base station 30. Alternatively, the transmitting/receiving section 202 may transmit the difference between the interference level in the interference estimation reference resources and the interference level in the specific resources to the centralized control base station 30.

The estimation section 203 estimates the interference level which the downlink signals for the user terminal 20b suffer, based on the interference estimation resource information received in the transmitting/receiving section 202. Note that the interference level which the downlink signals for the user terminal 20b receive may be the interference level caused by at least one of uplink signals from the user terminal 20a to the radio base station 10a and downlink signals from another radio base station apparatus 10 that neighbors the user terminal 20b.

To be more specific, with the first example, the estimation section 203 estimates the above interference level in the interference estimation resources designated by the interference estimation resource information. The estimation section 203 may output the estimated interference level to the determining section 204 (FIG. 6) or to the transmitting/receiving section 202 (FIG. 8).

Meanwhile, with the above second example, the estimation section 203 estimates the above interference level in specific resources determined based on interference estimation reference resources. These specific resources are determined based on interference estimation reference resources and a predetermined parameter (for example, "n," when n subframes following interference estimation reference resources are made specific resources). The predetermined parameter may be stored in advance, or may be reported from the radio base station 10b or the centralized control base station 30, with the interference estimation reference resources. Also, the estimation section 203 may estimate the above interference level in the interference estimation reference resources. The estimation section 203 outputs the estimated interference level to the transmitting/receiving section 202 (FIG. 10).

The determining section 204 determines whether or not to send an interference reduction request for the user terminal 20a (interfering station) based on the interference level estimated in the estimation section 203. To be more specific, when the interference level estimated in the estimation section 203 is greater than a predetermined threshold value, the determining section 204 determines sending an interference reduction request for the user terminal 20a, and outputs the interference reduction request to the transmitting/receiving section 202. As has been described above, by the interference reduction request, the radio base station 10a is requested to adopt the same DL/UL configurations as in the radio base station 10b, lower the transmission power of uplink signals from the user terminal 20a and so on. Note that, in the above case of the second example, the determining section 204 may be omitted.

Figure 15:
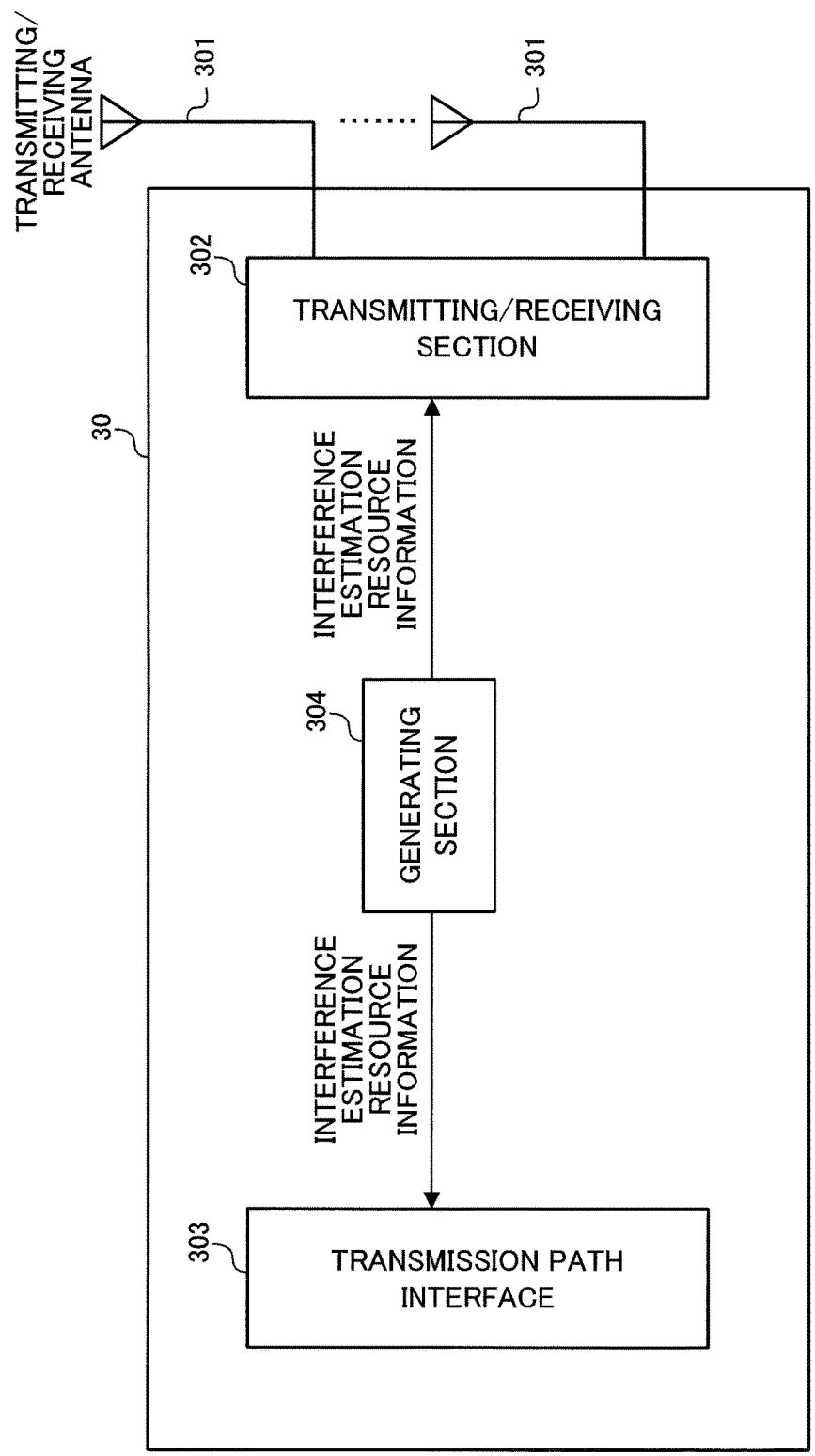
FIG. 15 is a functional configuration diagram of a centralized control base station according to the present embodiment.

FIG. 15 is a functional configuration diagram of a centralized control base station 30 according to the present embodiment. With FIG. 15, the functional configurations to report interference estimation resource information to the interfered station (radio base station 10a or user terminal 20b) will be primarily described. Note that the functional configurations shown in FIG. 15 may be provided in the radio base station 10b (radio base station #2) that reports interference estimation resource information in FIG. 5 and FIG. 6. As shown in FIG. 15, the centralized control base station 30 has a plurality of transmitting/receiving antennas 301 for MIMO transmission, a transmitting/receiving section 302, a transmission path interface 303, and a generating section 304.

The transmitting/receiving section 302 transmits and receives signals via a plurality of transmitting/receiving antennas 301, via a wireless link with the user terminal 20. The transmitting/receiving section 302 transmits interference estimation resource information that is input from the generating section 304, which will be described later, to the user terminal 20b (interfered station) (FIG. 8 and FIG. 11). The transmitting/receiving section 302 may transmit the interference estimation resource information through semi-static signaling of broadcast signals, higher layer signals and so on (for example, RRC signaling), or through dynamic signaling using control signals such as the PDCCH and the ePDCCH.

The transmission path interface 303 is a communication interface to transmit and receive signals between the centralized control base station 30 and the radio base station 10a or 10b. To be more specific, the transmission path interface 303 transmits interference estimation resource information that is input from the generating section 304, which will be described later, to the radio base station 10a (interfered station) (FIG. 7 and FIG. 10).

The generating section 304 estimates the interference estimation resource information that is used to estimate the interference level from downlink signals from the radio base station 10b against uplink signals for the radio base station 10a or the interference level from uplink signals from the user terminal 20a against downlink signals for the user terminal 20b.

To be more specific, the generating section 304 may generate interference estimation resource information that designates interference estimation resources, which are radio resources where the above interference level should be estimated (the first example), or generate interference estimation resource information that designates interference estimation reference resources, which are radio resources that serve as reference points upon estimating the above interference level (the second example).

Note that the interference estimation resources or the interference estimation reference resources may be determined based on, for example, DL/UL configurations applied to the radio base stations 10a and 10b, or may be determined in advance.

As has been described above, with the radio communication system 1 according to the present embodiment, information on resources for interference estimation is reported to the interfered station, and the interference level is estimated based on this information on resources for interference estimation. Consequently, it is possible to adequately estimate the interference level which the interfered station receives from the interfering station, and reduce the impact of interference in the interfered station.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-127183, filed on Jun. 4, 2012, including the specification, drawings and abstract, is incorporated herein by reference in its entirety.

The invention claimed is:

1. A radio base station that receives an uplink signal using a time division duplexing (TDD) scheme, comprising:
a processor that estimates an interference level that the uplink signal receives for each of a plurality of subframes of which a downlink/uplink configuration differs among a cell associated with the base station and a neighboring cell associated with another base station; and
a transmitter that transmits the interference level for each uplink subframe of the plurality of subframes,
wherein the processor estimates the interference level based on received radio resource information specified in subframes associated with subframe index-numbers predetermined by the another base station.

2. The radio base station according to claim 1, wherein the plurality of subframes comprises at least two of subframes #3, #4, #7, #8 and #9 in a radio frame.

3. The radio base station according to claim 2, wherein the processor estimates the interference level in a bandwidth of the radio base station in each of the plurality of subframes.

4. The radio base station according to claim 1, wherein the processor estimates the interference level in a bandwidth of the radio base station in each of the plurality of subframes.

5. The radio base station according to claim 1, wherein the transmitter transmits information about the interference level about all resource blocks of the plurality of subframes.

6. A radio communication system comprising: a user terminal; and a radio base station that receives an uplink signal from the user terminal using a time division duplexing (TDD) scheme, the radio base station comprising:
- a processor that estimates an interference level that the uplink signal receives for each of a plurality of subframes of which a downlink/uplink configuration differs among a cell associated with the base station and a neighboring cell associated with another base station; and
- a transmitter that transmits the interference level for each uplink subframe of the plurality of subframes,
- wherein the processor estimates the interference level based on received radio resource information specified in subframes associated with subframe index-numbers predetermined by the another base station.

7. The radio communication system according to claim 6, wherein the plurality of subframes comprises at least two of subframes #3, #4, #7, #8 and #9 in a radio frame.

8. The radio communication system according to claim 7, wherein the processor estimates the interference level in a bandwidth of the radio base station in each of the plurality of subframes.

9. The radio communication system according to claim 6, wherein the processor estimates the interference level in a bandwidth of the radio base station in each of the plurality of subframes.

10. The radio communication system according to claim 6, wherein the transmitter transmits information about the interference level about all resource blocks of the plurality of subframes.

11. A radio communication method in a radio communication system having a user terminal and a radio base station that receives an uplink signal from the user terminal using a time division duplexing (TDD) scheme, the radio communication method comprising the steps of:
- estimating, by the radio base station, an interference level that the uplink signal receives for each of a plurality of subframes of which a downlink/uplink configuration differs among a cell associated with the base station and a neighboring cell associated with another base station; and
- transmitting, by the radio base station, the interference level for each uplink subframe of the plurality of subframes,
- wherein estimating the interference level is based on received radio resource information specified in subframes associated with subframe index-numbers predetermined by the another base station.

12. The radio communication method according to claim 11, wherein the plurality of subframes comprises at least two of subframes #3, #4, #7, #8 and #9 in a radio frame.

13. The radio communication method according to claim 12, wherein in the step of estimating, the radio base station estimates the interference level in a bandwidth of the radio base station in each of the plurality of subframes.

14. The radio communication method according to claim 11, wherein in the step of estimating, the radio base station estimates the interference level in a bandwidth of the radio base station in each of the plurality of subframes.

15. The radio communication method according to claim 11, wherein in the step of transmitting, the radio base station transmits information about the interference level about all resource blocks of the plurality of subframes.

* * * * *